United States Patent [19]

Ishizuka et al.

[11] Patent Number: 5,390,022
[45] Date of Patent: Feb. 14, 1995

[54] DISPLACEMENT INFORMATION DETECTION APPARATUS FOR RECEIVING A DIVERGENT LIGHT BEAM

[75] Inventors: Koh Ishizuka, Ohmiya; Tetsuharu Nishimura, Kawasaki; Hiroshi Kondo, Yokohama; Yasushi Kaneda, Tokyo, all of Japan

[73] Assignee: Canon Kabushiki Kaisha, Tokyo, Japan

[21] Appl. No.: 42,589

[22] Filed: Apr. 5, 1993

[30] Foreign Application Priority Data

Apr. 7, 1992 [JP] Japan .................... 4-085447
Dec. 17, 1992 [JP] Japan .................... 4-337403

[51] Int. Cl.$^6$ ........................................ G01B 9/02
[52] U.S. Cl. ................................. 356/356; 356/363; 250/237 G
[58] Field of Search ........................ 356/356, 358; 250/227 G, 231.14, 231.16

[56] References Cited

U.S. PATENT DOCUMENTS

| | | | |
|---|---|---|---|
| 4,176,276 | 11/1979 | Kaul et al. | 350/237 |
| 4,732,483 | 3/1988 | Biegen | 356/351 |
| 4,766,310 | 8/1988 | Michel | 250/237 |
| 4,979,827 | 12/1990 | Matsui | 356/356 |
| 5,283,434 | 2/1994 | Ishifuka et al. | 250/231.16 |
| 5,302,821 | 4/1994 | Igaki et al. | 250/237 G |

FOREIGN PATENT DOCUMENTS

| | | |
|---|---|---|
| 0163362 | 12/1985 | European Pat. Off. . |
| 0223009 | 5/1987 | European Pat. Off. . |
| 0463561 | 1/1992 | European Pat. Off. . |
| 2653545 | 5/1978 | Germany . |
| 62-121314 | 6/1987 | Japan . |
| 01180615 | 12/1989 | Japan . |
| 02262064 | 10/1990 | Japan . |
| 2247313 | 2/1992 | United Kingdom . |
| WO86/03833 | 3/1986 | WIPO . |
| WO87/07944 | 7/1986 | WIPO . |

*Primary Examiner*—Samuel A. Turner
*Assistant Examiner*—Robert Kim
*Attorney, Agent, or Firm*—Fitzpatrick, Cella, Harper & Scinto

[57] ABSTRACT

A displacement information detection apparatus for detecting relative displacement information regarding the apparatus and an object to be detected includes an illumination system for radiating coherent light. A first diffraction grating splits the coherent light from the illumination system into first and second light beams, which are radiated onto the object. A second diffraction grating synthesizes the first and second light beams emerging from the object to generate an interference light beam. A light-receiving element detects the interference light beam and detects the relative displacement information regarding the object and the apparatus upon reception of the interference light beam. The illumination system is configured to focus the first and second light beams at a location along an optical path between the first diffraction grating and the second diffraction grating, so that the interference light beam incident on the light-receiving element is a divergent light beam.

25 Claims, 18 Drawing Sheets

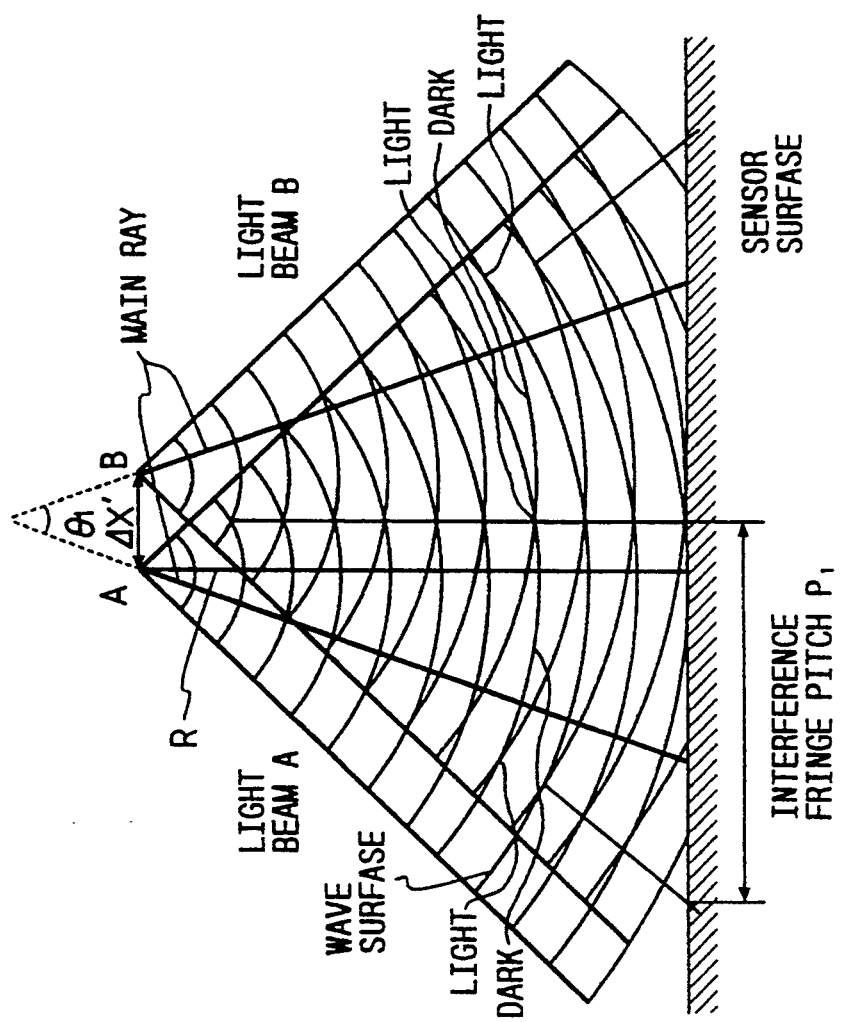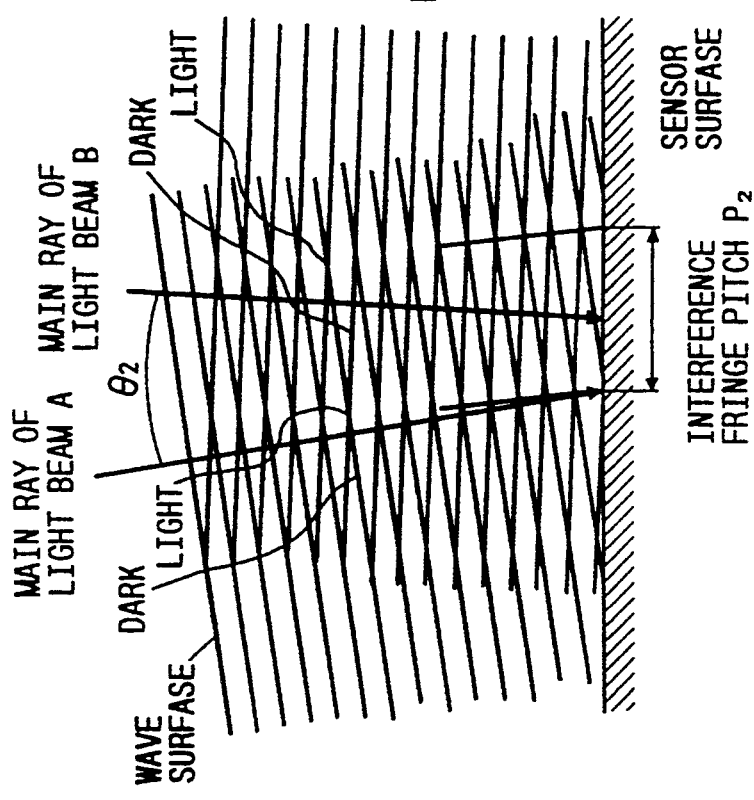

DISPLACEMENT INFORMATION DETECTION APPARATUS FOR RECEIVING A DIVERGENT LIGHT BEAM

BACKGROUND OF THE INVENTION

1. Field of the Invention

The present invention relates to a displacement information detection apparatus and, more particularly, to an apparatus suitable for optical displacement sensors such as an encoder, a speed sensor, an acceleration sensor, and the like, which measure a displacement and a speed of an object by utilizing the fact that when a light beam radiated onto an object being displaced is diffracted or scattered, the diffracted or scattered light beam is phase-modulated according to the displacement or the moving speed of the object.

2. Related Background Art

Conventionally, optical displacement sensors, e.g., an optical encoder, a laser Doppler speedometer, a laser interferometer, and the like, for obtaining a physical quantity such as movement or displacement of an object with high precision by radiating light onto the object are widely used mainly in the fields of NC working machines, OA equipment, robots, and the like. As a conventional displacement sensor, for example, Japanese Laid-Open Utility Model Application No. 1-180615 and Japanese Laid-Open Patent Application No. 62-121314 disclose optical encoders. Also, Japanese Laid-Open Patent Application No. 2-262064 discloses a laser Doppler speedometer.

In consideration of an application of the displacement sensor to wider fields, the displacement sensor is required to have a more compact structure (on the order of mm), and higher precision and resolution (on the order of 0.1 μm). If the displacement sensor has a size on the order of mm, it may be used while being directly adhered to an object to be measured by, e.g., an adhesive. For this reason, the displacement sensor can be used for smaller devices, and the application field range can be remarkably widened. However, it is difficult for the conventional displacement sensor to achieve both a compact structure and high-precision/high-resolution characteristics.

SUMMARY OF THE INVENTION

It is the first object of the present invention to provide a displacement information detection apparatus, which can satisfactorily achieve both a compact structure and high-precision/high-resolution characteristics, and is strong against a rotation error generated between the sensor head side and the object side, and a system using the apparatus.

Other objects of the present invention will become apparent from the following description of the embodiments.

BRIEF DESCRIPTION OF THE DRAWINGS

FIGS. 6A and 6B are views for comparing a case wherein a parallel light beam (plane wave) is incident on the light-receiving surface of a light-receiving element (FIG. 6A) and a case wherein a divergent light beam (spherical wave) is incident on the light-receiving surface (FIG. 6B);

DESCRIPTION OF THE PREFERRED EMBODIMENTS

First Embodiment

Figure 1:
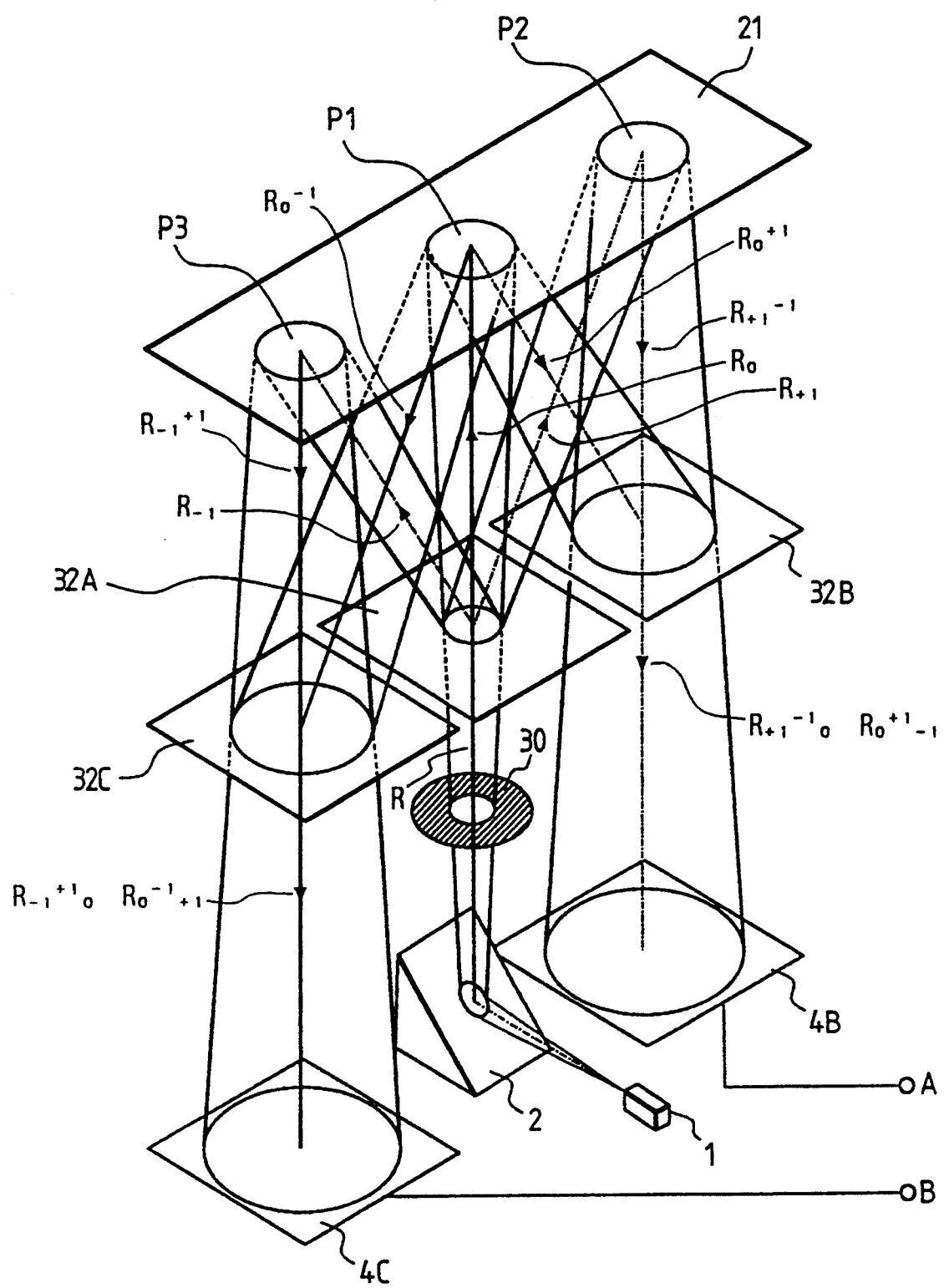
FIG. 1 is a perspective view showing an arrangement according to the first embodiment of the present invention.

FIG. 1 is a perspective view showing main part of an optical encoder according to the first embodiment of the present invention.

A member 1 is a light-emitting element for emitting light, and has a size on the order of several hundreds of μm. The light-emitting element of this embodiment comprises a semiconductor laser element for generating a laser beam having a wavelength of 780 nm. Note that the light-emitting element may comprise, e.g., a light-emitting diode in place of the semiconductor laser element. Light emitted from the light-emitting element 1 arranged on a horizontal plane is reflected by a mirror 2 whose mirror surface is formed to have an inclination of 45° so as to propagate in the vertical direction. Note that a prism may be used in place of the mirror. A transparent glass plate (not shown) as a light transmission member is arranged in the propagation direction of the light. Three diffraction grating portions 32A, 32B, and 32C having the same pitch are formed on one surface of the glass plate. The pitch P of each diffraction grating portion is set to be 1.6 μm in this embodiment. Light-receiving elements 4B and 4C are arranged to receive light and to photoelectrically convert the received light. An example of the light-receiving element includes a photodiode, an avalanche photodiode, a PIN photodiode, a CCD, or a light-receiving IC having such a light-receiving portion, and a circuit for amplifying or processing an output photocurrent. The light-receiving elements 4B and 4C detect signals having a phase difference therebetween.

A divergent light beam emitted from the light-emitting element 1 is deflected by the mirror 2 in the vertical direction, and is converted into a divergent light beam R having a predetermined beam diameter by a mask 30 having a circular aperture. This light beam is transmission-diffracted by the diffraction grating 32A formed on one surface of the glass plate, and emerges as a plurality of split light beams including a 0th-order diffracted light beam $R_0$, a +1st-order diffracted light beam $R_{+1}$, and a −1st-diffracted light beam $R_{-1}$.

Of these light beams, the light beam $R_0$ transmitted straight through the diffraction grating 32A is reflection-diffracted by a point P1 on a diffraction grating 21 formed on a scale, and is split into a +1st-order diffracted light beam $R_0{}^{+1}$ and a −1st-order diffracted light beam $R_0{}^{-1}$ so as to be phase-modulated. When the scale is relatively moved, the phase of the +1st-order diffracted light beam $R_0{}^{+1}$ is shifted by $2\pi x/P$, and the phase of the −1st-order diffracted light beam $R_0{}^{-1}$ is shifted by $-2\pi x/P$ (where x is the moving amount of the diffraction grating 21, and P is the pitch of the diffraction grating 21).

The +1-order diffracted light beam $R_0{}^{+1}$ is transmission-diffracted by the diffraction grating 32B formed on one surface of the glass plate, and is split into a 0th-order diffracted light beam $R_0{}^{+1}{}_0$, a −1st-order diffracted light beam $R_0{}^{+1}{}_{-1}$, and other light beams. Of these light beams, the −1st-order diffracted light beam $R_0{}^{+1}{}_{-1}$ is extracted in a direction perpendicular to the diffraction grating surface, and the phase of the wave surface at that time is $+2\pi x/P$. On the other hand, the −1st-order diffracted light beam $R_0{}^{-1}$ is transmission-diffracted by the diffraction grating 32C formed on one surface of the glass plate, and is split into a 0th-order diffracted light beam $R_0{}^{-1}{}_0$, a +1st-order diffracted light beam $R_0{}^{-1}{}_{+1}$, and other light beams. Of these light beams, the +1st-order diffracted light beam $R_0{}^{-1}{}_{+1}$ is extracted in a direction perpendicular to the diffraction grating surface, and the phase of the wave surface at that time is $-2\pi x/P$.

In this case, when the phase relationship of the grating arrangement of the diffraction grating 32B is shifted by P/4 from that of the diffraction grating 32C, the phase of the wave surface of the +st-order diffracted light beam $R_0{}^{-1}{}_{+1}$ is further shifted by $-2\pi(P/4)/P = -\pi/2$ to be $-2\pi x/P - \pi/2$.

On the other hand, the light beam $R_{+1}{}^{-1}$, which is +1st-order-diffracted by the diffraction grating 32A formed on one surface of the glass plate, is reflection-diffracted by a point P2 on the diffraction grating 21 on the scale 20, and is split into a −1st-order diffracted light beam $R_{+1}{}^{-1}$, a 0th-order diffracted light $R_{+1}{}^0$, and other light beams so as to be phase-modulated. Of these light beams, the −1st-order diffracted light beam $R_{+1}{}^{-1}$ is incident on the diffraction grating 32B while its phase is shifted by $-2\pi x/P$, and the phase of the wave surface of the 0th-order diffracted light $R_{+1}{}^{-1}{}_0$, which is transmitted straight through the diffraction grating, is $-2\pi x/P$.

Also, the light beam $R_{-1}$, which is −1st-order-diffracted by the diffraction grating 32A formed on one surface of the glass plate 3, is reflection-diffracted by a point P3 on the diffraction grating 21 on the scale, and is split into a +1st-order diffracted light beam $R_{-1}{}^{+1}$, a 0th-order diffracted light $R_{-1}{}^0$, and other light beams so as to be phase-modulated. Of these light beams, the +1st-order diffracted light beam $R_{-1}{}^{+1}$ is incident on the diffraction grating 32C while its phase is shifted by $+2\pi x/P$, and the phase of the wave surface of the 0th-order diffracted light $R_{-1}{}^{+1}{}_0$, which is transmitted straight through the diffraction grating, is $+2\pi x/P$.

The light beams $R_{+1}{}^{-1}{}_0$ and $R_0{}^{+1}{}_{-1}$ whose optical paths are caused to overlap each other by the diffraction grating 32B, are converted into an interference light beam, the interference light beam is focused to be incident on the light-receiving element 4B. At this time, the phase of the interference light beam is given by:

$$\{+2\pi x/P\} - \{-2\pi x/P\} = 4\pi x/P \quad (1)$$

Thus, a light/dark signal for one period is generated every time the diffraction grating 21 on the scale 20 is moved by a ½ pitch.

The light beams $R_{-1}{}^{+1}{}_0$ and $R_0{}^{-1}{}_{+1}$ whose optical paths are caused to overlap each other by the diffraction grating 32C, are converted into an interference light beam, the interference light beam is focused by a lens to be incident on the light-receiving element 4C. At this time, the phase of the interference light beam is given by:

$$\{-2\pi x/P - \pi/2\} = -4\pi x/P - \pi/2 \quad (2)$$

Thus, a light/dark signal for one period is generated every time the diffraction grating 21 on the scale is moved by a ½ pitch, and the light/dark timing of this signal is shifted by a ¼ period from that of the light-receiving element 4B.

As described above, upon displacement of the scale, periodic signals A and B which have a phase difference of a ¼ period (90°) therebetween can be obtained by the light-receiving elements 4B and 4C. Based on these signals, a relative displacement state between the sensor unit and the scale can be detected using known signal processing circuits such as an amplifier, a signal interpolation circuit, a binarization circuit, a direction discrimination circuit, and the like. In this embodiment, some or all of these signal processing circuits are incorporated in the sensor unit, thus increasing the degree of integration.

Figure 2:
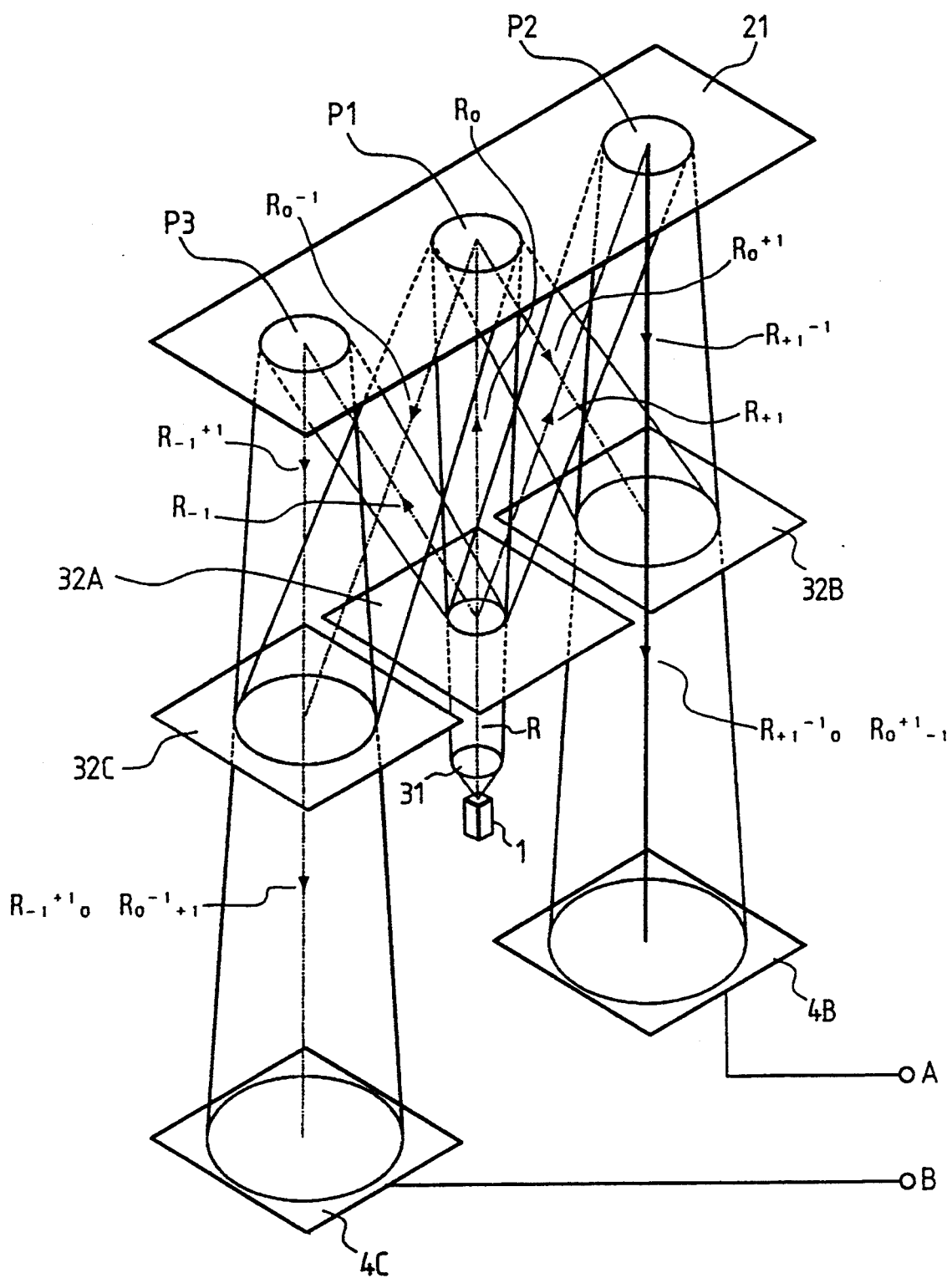
FIG. 2 is a perspective view showing an arrangement of a modification of the first embodiment shown in FIG. 1.

The arrangement for forming a divergent light beam is not limited to that shown in FIG. 1. For example, a lens 31 may be used in place of the mask, as shown in FIG. 2 so as to form a proper divergent light beam.

Figure 5:
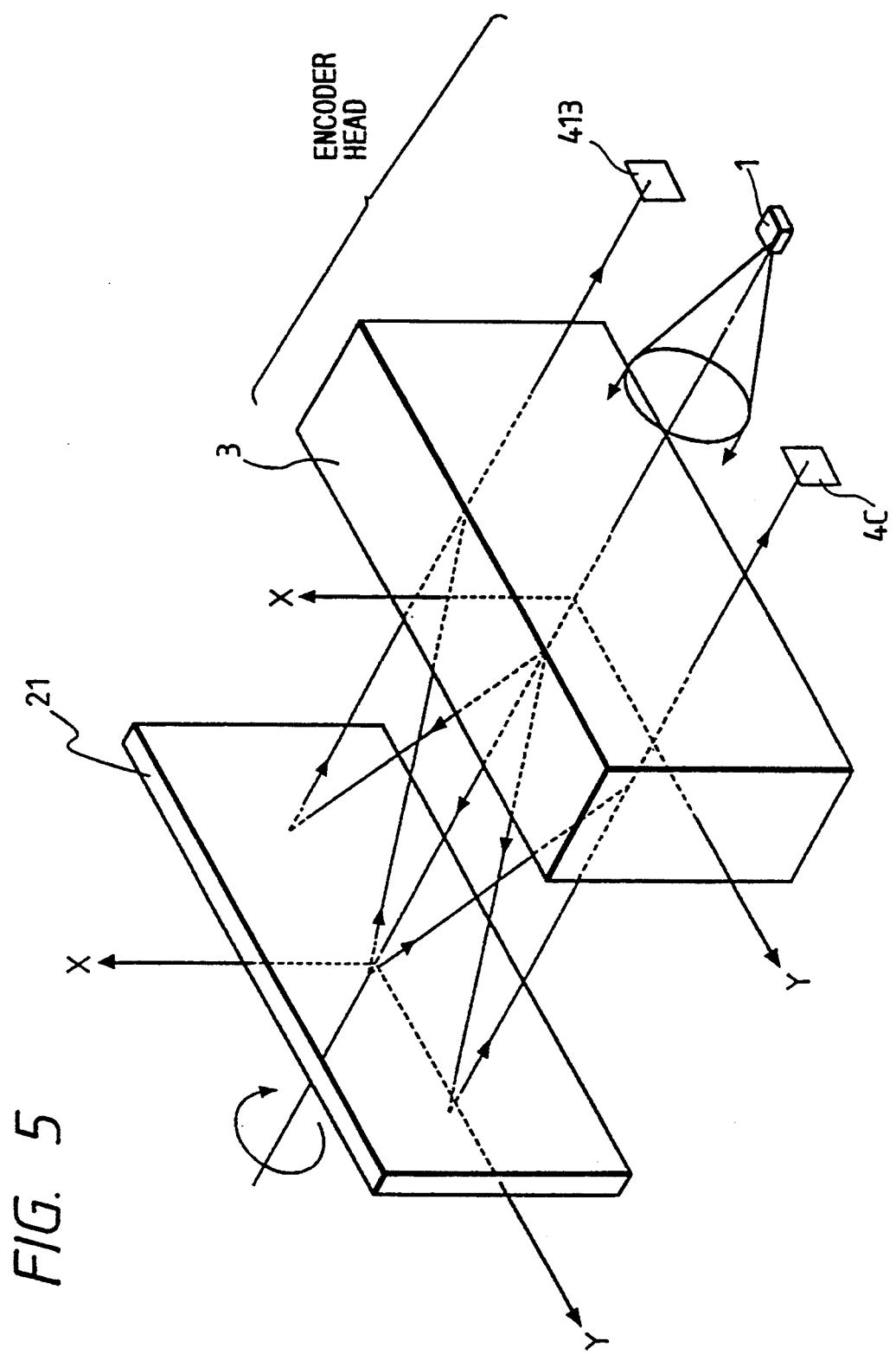
FIG. 5 is a view for explaining the adverse effect caused by a mounting error of a scale 21.

The characteristic feature of this embodiment is that a divergent light beam, i.e., a spherical wave is incident on the light-receiving element. FIGS. 6A and 6B are views for comparing a case wherein a light beam is a parallel light beam (plane wave) and a case wherein a light beam is a divergent light beam (spherical wave). When the light beam is a parallel light beam, i.e., a plane wave, as shown in FIG. 6A, a pitch $P_2$ of interference fringes upon interference of two parallel light beams is determined by an angle $\theta_2$ between the two light beams. Therefore, as shown in FIG. 5, when a mounting error of the scale occurs in the rotational direction of an arrow with respect to an encoder head, the interference state undesirably changes. More specifically, in the case of the plane wave, the scale is required to have high mounting precision with respect to the encoder head.

In contrast to this, as shown in FIG. 6B, when two interfering light beams A and B are divergent light beams (convex spherical waves in the propagation direction), a pitch $P_1$ of interference fringes depends on the ratio ($\Delta X/R$) of a separation amount $\Delta X$ at light-emitting points A and B and a distance R from each light-emitting point to the observation surface (the spherical wave on the observation surface has a curvature $1/R$) independently of an angle $\theta_1$ formed between main rays of the light beams A and B. As the ratio $\Delta X/R$ becomes close to 0, the pitch $P_1$ of the interference fringes is increased, and consequently, a change in interference state becomes small. Therefore, when R is set to be as large as possible with respect to the separation amount $\Delta X$ at the light-emitting points A and B, the spherical wave can decrease a variation in output caused by mounting errors of the scale in the rotational direction, as shown in FIG. 5, as compared to the plane wave.

In this embodiment, when divergent light beams (spherical waves) having a proper curvature are caused to become incident on the light-receiving surfaces of the light-receiving elements 4B and 4C by the mask 30 or the lens 31, as described above, the influence on an output caused by the mounting error of a diffraction grating 21 provided on the scale or the mounting error of the scale, as shown in FIG. 5, is eliminated, and an encoder, which allows easy assembling, and is strong against a variation in environment, can be achieved.

Second Embodiment

Figure 3:
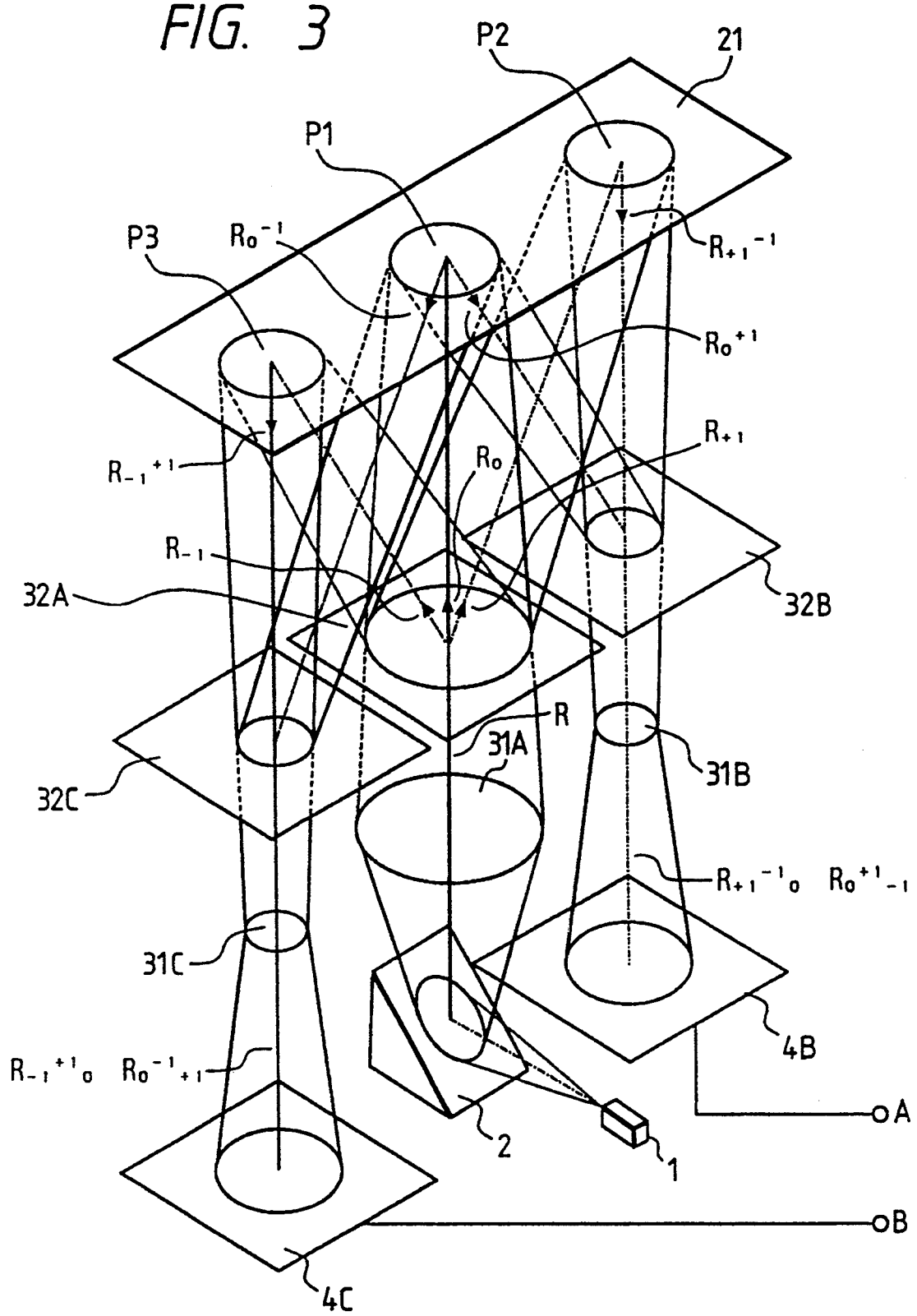
FIG. 3 is a perspective view showing an arrangement according to the second embodiment of the present invention.

FIG. 3 shows an arrangement of an encoder according to the second embodiment of the present invention, wherein spherical waves are incident on light-receiving elements like in the first embodiment. In FIG. 3, a lens 31A converts light emitted from a light-emitting element into a convergent light beam or a parallel light beam, and lenses 31B and 31C are arranged to convert the convergent or parallel light beam into a proper divergent light beam, and to cause them to be incident on the light-receiving elements 4B and 4C. These lenses 31A, 31B, and 31C, and the diffraction gratings 32A, 32B, and 32C are respectively formed on the front and rear surfaces of a transparent glass plate.

A divergent light beam emitted from the light-emitting element 1 is deflected by the mirror 2, and is converted into a convergent or substantially parallel light beam R by the lens 31A. The convergent or parallel light beam R is radiated onto the diffraction grating 32A. The detection principle itself of the encoder is the same as that of the above embodiment. In this embodiment, however, convergent or parallel light beams $R_{+1}{}^{-1}{}_0$ and $R_0{}^{+1}{}_{-1}$ whose optical paths are caused to overlap each other by the diffraction grating 32B are converted by the lens 31B into proper divergent interference light (spherical wave), and the interference light is incident on the photoelectric element 4B. Also, convergent or parallel light beams $R_{-1}{}^{+1}{}_0$ and $R_0{}^{-1}{}_{+1}$ whose optical paths are caused to overlap each other by the diffraction grating 32C are converted by the lens 31C into proper divergent interference light (spherical wave), and the interference light is incident on the photoelectric element 4C.

As described above, according to this embodiment, since the interference light beams are converted into divergent light beams immediately before the photoelectric elements 4B and 4C, the amounts of light beams incident on the photoelectric elements 4B and 4C can be increased. Therefore, a stable signal having a good S/N ratio can be obtained in addition to the effect of the first embodiment.

Third Embodiment

Figure 4:
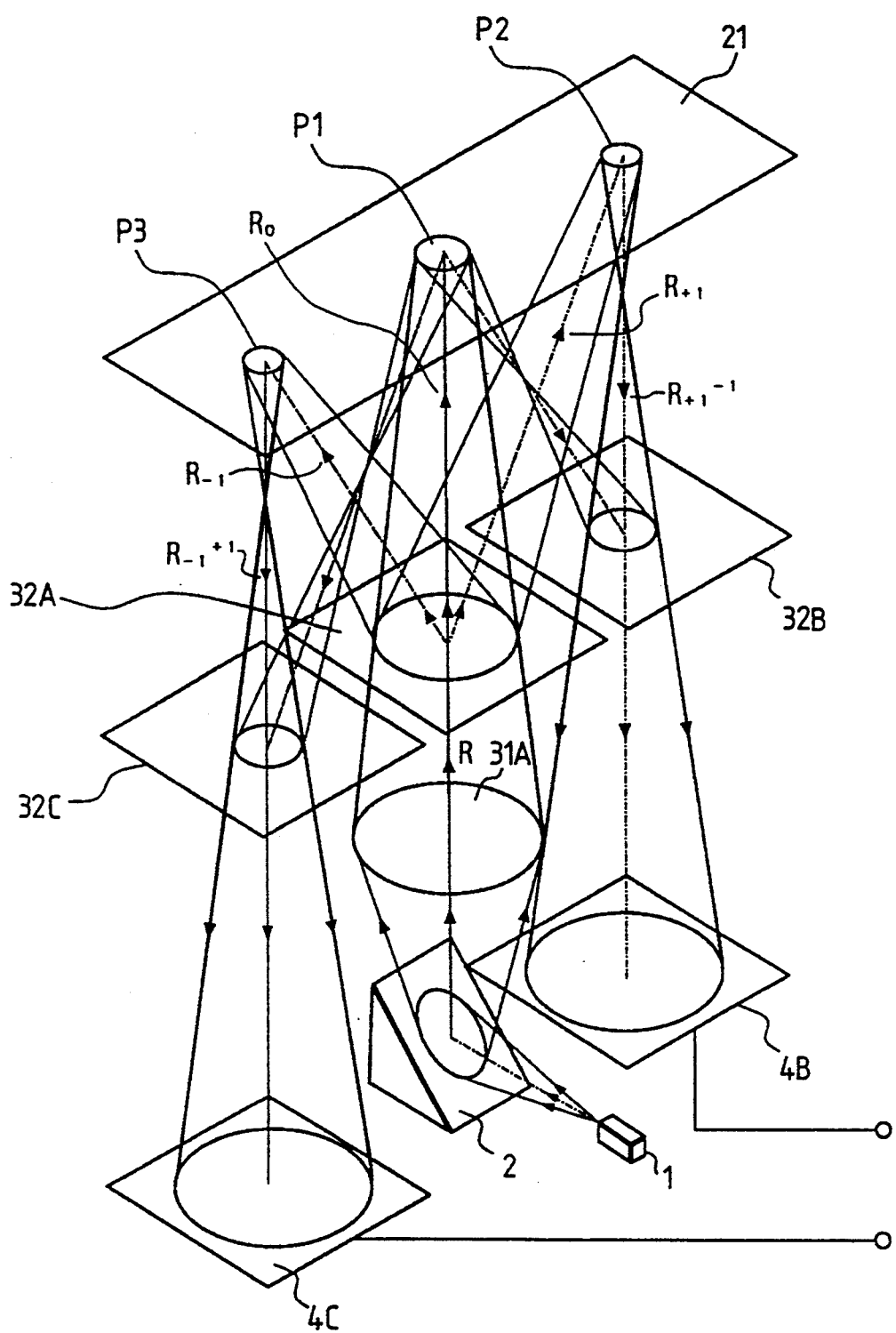
FIG. 4 is a perspective view showing an arrangement according to the third embodiment of the present invention.

FIG. 4 shows an arrangement of an encoder according to the third embodiment of the present invention, wherein spherical waves are incident on light-receiving elements like in the first and second embodiments. The lens 31A focuses light emitted from the light-emitting element 1. The converged light is temporarily focused near the scale diffraction grating 21, and is then incident on the photoelectric elements 4B and 4C as divergent light.

In this state, even if an alignment error occurs between the scale diffraction grating 21 and the diffraction gratings 32A, 32B, and 32C, since the positions of point light sources of two incident spherical waves when viewed from the sensor surface are located near the scale diffraction grating, the two incident spherical waves are almost not influenced by the alignment error. More specifically, as has been described in the first embodiment, since the separation amount $\Delta X$ of the light-emitting points A and B becomes almost 0, the pitch $P_1$ of interference fringes becomes almost an infinity independently of $\theta_1$, and the interference state is almost not changed.

Fourth Embodiment

Figure 7:
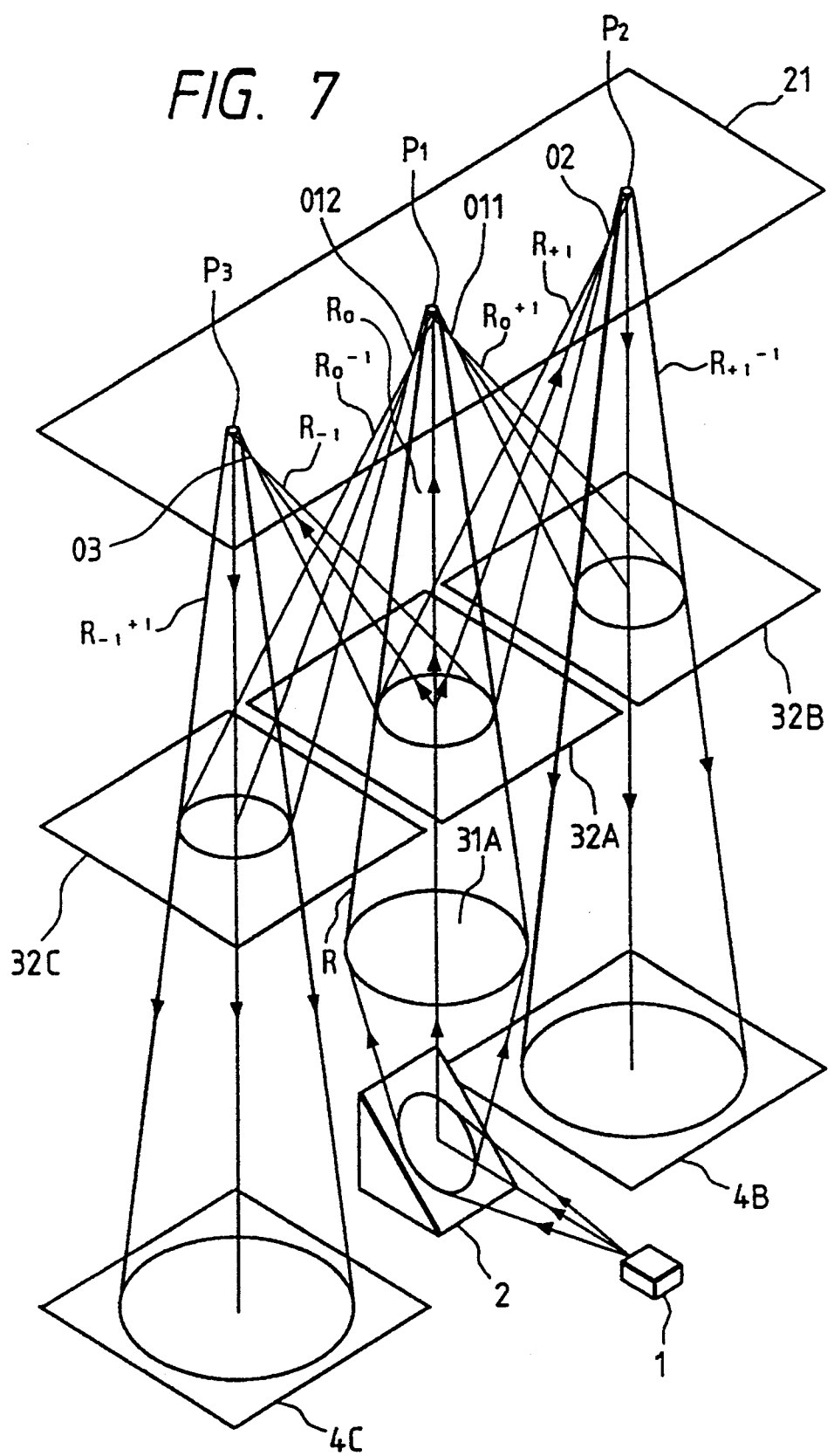
FIG. 7 is a perspective view showing an arrangement according to the fourth embodiment of the present invention.

FIG. 7 shows an arrangement of an encodes according to the fourth embodiment of the present invention, wherein spherical waves are incident on light-receiving elements like in the first to third embodiments. In this embodiment, a light beam is caused to converge on a middle point along an optical path extending between a split diffraction grating and a synthesizing diffraction grating, so that a change in interference state caused by the mounting error can be suppressed. Thus, a variation in output caused by the change in interference state on the light-receiving surface is minimized, and a signal less influenced by mounting errors and having a good S/N ratio can be obtained. Since the encoder is constituted by one light-emitting element, at least one mask or lens, three diffraction gratings provided to a measurement head, a diffraction grating provided to a scale, and two photoelectric elements, a compact, high-precision, and low-cost encoder, which allows easy mounting and assembling processes, has a simple structure, and is easy to handle, can be constituted.

This embodiment will be described below with reference to FIG. 7.

FIG. 7 is a perspective view showing an arrangement of an optical encoder according to this embodiment. The same reference numerals in FIG. 7 denote the same parts as in the above embodiments. A divergent light beam emitted from the light-emitting element 1 is deflected by the mirror 2, and is converted into a proper convergent light beam by the lens 31A. The convergent light beam is transmission-diffracted by the diffraction grating 32A, and emerges therefrom as three split beams, i.e., a 0th-order diffracted light beam $R_0$, a +1st-order diffracted light beam $R_{+1}$, and a −1st-order diffracted light beam $R_{-1}$.

The light beam $R_0$ transmitted straight through the diffraction grating 32A is reflection-diffracted by a point P1 on the diffraction grating 21 formed on the scale, and is split into a +1st-order diffracted light beam $R_0{}^{+1}$ and a −1st-order diffracted light beam $R_0{}^{-1}$ so as to be phase-modulated. These light beams respectively converge on points 011 and 012 near the diffraction grating 21.

The phase of the +1st-order diffracted light beam $R_0{}^{+1}$ is shifted by $+2\pi x/P$ and the phase of the 1st-order diffracted light beam $R_0{}^{-1}$ is shifted by $-2\pi x/P$ (where x is the moving amount of the diffraction grating 21, and P is the pitch of the diffraction grating 21).

The +1st-order diffracted light beam $R_0{}^{+1}$ is transmission-diffracted by the diffraction grating 32B, and is split into a 0th-order diffracted light beam $R_0{}^{+1}{}_0$, a −1st-order diffracted light beam $R_0{}^{-1}{}_{-1}$, and other light beams. Of these light beams, the −1st-order diffracted light beam $R_0{}^{-1}{}_{-1}$ is extracted in a direction perpendicular to the diffraction grating surface. The phase shift of the wave surface of this light beam is $+2\pi x/P$ unless the diffraction grating 32B suffers from a phase shift.

The −1st-order diffracted light beam $R_0{}^{-1}$ is transmission-diffracted by the diffraction grating 32C, and is split into a 0th-order diffracted light beam $R_0{}^{-1}{}_0$, a +1st-order diffracted light beam $R_0{}^{-1}{}_{+1}$, and other light beams. Of these light beams, the +1st-order diffracted light beam $R_0{}^{-1}{}_{+1}$ is extracted in a direction perpendicular to the diffraction grating surface. The phase shift of the wave surface of this light beam is $-2\pi x/P$ unless the diffraction grating 32C suffers from a phase shift.

In this case, when the phase relationship of the grating arrangement of the diffraction grating 32B is shifted by P/4 from that of the diffraction grating 32C, the phase of the wave surface of the +1st-order diffracted light beam $R_0{}^{-1}{}_{+1}$ is further shifted by $-2\pi(P/4)/P = -\pi/2$ to be $-2\pi x/P - \pi/2$.

The light beam $R_{+1}$, which is +1st-order-diffracted by the diffraction grating 32A, converges on a point 02 near the diffraction grating 21. Thereafter, the light beam $R_{+1}$ is reflection-diffracted by a point P2 on the diffraction grating 21 on the scale, and is split into a −1st-order diffracted light beam $R_{+1}{}^{-1}$, a 0th-order diffracted light beam $R_{+1}{}^0$, and other light beams so as to be phase-modulated. Of these light beams, the −1st-order diffracted light beam $R_{+1}{}^{-1}$ is incident on the diffraction grating 32B while its phase is shifted by $-2\pi x/P$, and the phase of the wave surface of the 0th-order diffracted light $R_{+1}{}^0$ which is transmitted straight through the diffraction grating, is $-2\pi x/P$.

The light beam $R_{-1}$, which is −1st-order-diffracted by the diffraction grating 32A, converges on a point 03 near the diffraction grating 21. Thereafter, the light beam $R_{-1}$ is reflection-diffracted by a point P3 on the diffraction grating 21 on the scale, and is split into a +1st-order diffracted light beam $R_{-1}{}^{+1}$, a 0th-order diffracted light $R_{-1}{}^0$ and other light beams so as to be phase-modulated. Of these light beams, the +1st-order diffracted light beam $R_{-1}{}^{+1}$ is incident on the diffraction grating 32C while its phase is shifted by $+2\pi x/P$, and the phase of the wave surface of the 0th-order diffracted light $R_{-1}{}^0$, which is transmitted straight through the diffraction grating, is $+2\pi x/P$.

The above-mentioned convergence point of each light beam is set at a middle optical path length position of the optical path length of the optical path from the grating 32A to the grating 32B or 32C of the corresponding light beam. More specifically, if the optical path lengths of the light beams $R_{+1}{}^{-1}$ and $R_0{}^{+1}$ from the diffraction grating 21 to the diffraction grating 32B are respectively represented by L and L', the convergence points of the light beam $R_{+1}{}^{-1}$ (i.e., the light beam $R_{+1}$) and the light beam $R_0{}^{+1}$ are set to be formed at positions having an optical path length of about (L+L')/2 from the diffraction grating 32B. The same applies to the light beams $R_{-1}{}^{+1}$ and $R_0{}^{-1}$.

The light beams $R_{+1}{}^{-1}{}_0$ and $R_0{}^{+1}{}_{-1}$ whose optical paths are caused to overlap each other by the diffraction grating 32B, are incident on the photoelectric element 4B as an interference light beam. An interference phase at this time is given by:

$$\{+2\pi x/P\} - \{-2\pi x/P\} = 4\pi x/P \tag{3}$$

Thus, a light/dark signal for one period is generated every time the diffraction grating 21 on the scale is moved by a $\kappa$ pitch.

The light beams $R_{-1}{}^{+1}{}_0$ and $R_0{}^{-1}{}_{+1}$ whose optical paths are caused to overlap each other by the diffraction grating 32C, are incident on the photoelectric element 4C as an interference light beam. An interference phase at this time is given by:

$$\{-2\pi x/P\} - \{+2\pi x/P\} = -4\pi x/P \tag{4}$$

Thus, a light/dark signal for one period is generated every time the diffraction grating 21 on the scale is moved by a ½ pitch, and the light/dark timing of this signal is shifted by a ¼ period from that of the photoelectric element 4B.

Since the above-mentioned apparatus has a very simple interference optical system, when the lenses and the diffraction gratings are formed on two surfaces of a glass plate by, e.g., a replica manufacturing method, a compact and low-cost encoder can be realized. In this embodiment, the following merits can be particularly expected.

1) Even when the diffraction grating 21 on the scale and the diffraction gratings (32A, 32B, and 32C) for splitting and synthesizing light beams are arranged to have an angular displacement therebetween, an interference signal can be stably output. The reason for this will be explained below with reference to FIGS. 8 to 17.

Figure 8:
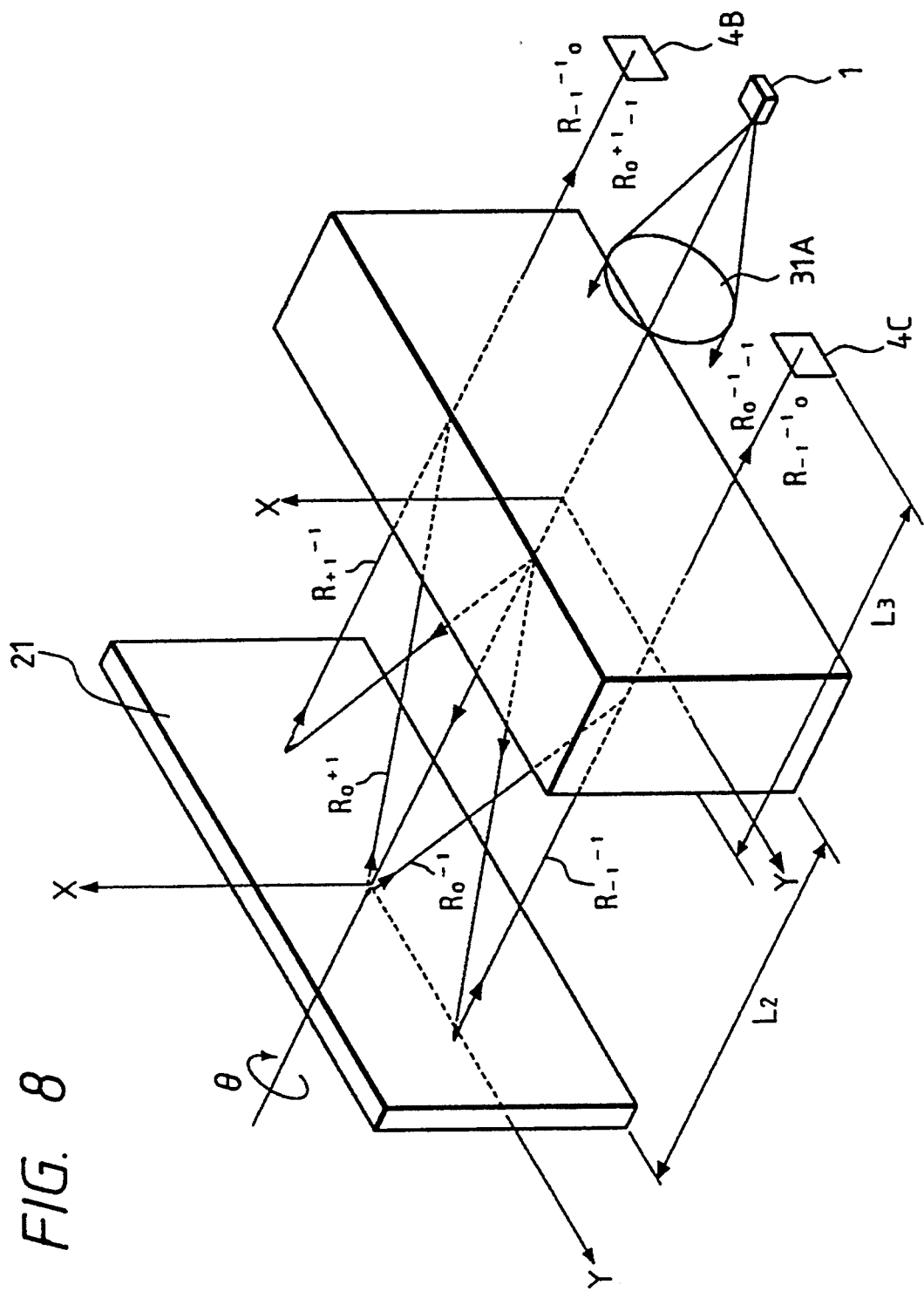
FIG. 8 is a principle view for explaining a mounting error of a scale relative to a head.

FIG. 8 shows the principle of the apparatus shown in FIG. 7, and the mirror 2 is not illustrated. In an original state wherein no rotational displacement occurs between the diffraction grating 21 and the diffraction gratings 32A, 32B, and 32C in association with the two interfered light beams detected on the two sensor surfaces, the main rays of the two interfered light beams coincide with each other, and the spherical waves of these light beams always define a concentric state.

Figure 9:
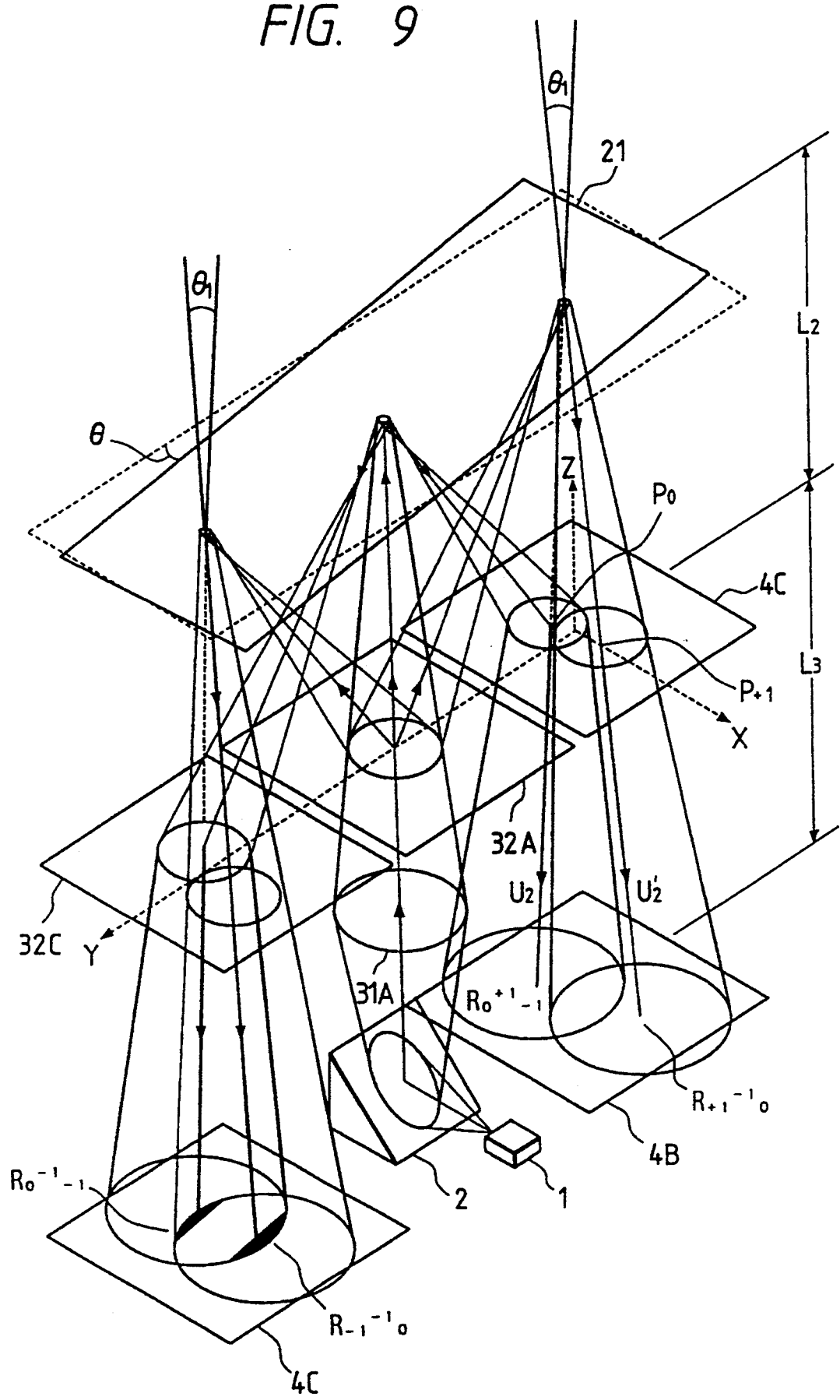
FIG. 9 is a perspective view for explaining a mounting error of a scale relative to a head.

However, when an azimuth angular displacement θ shown in FIG. 8 is given to the scale, an angular difference (θ1) is formed between the main rays of the two light beams, as shown in FIG. 9. In this case, interference nonuniformity may slightly occur on the sensor surfaces due to the displacement between the spherical waves of the two light beams although its level is considerably smaller than that caused by plane waves.

Figure 10:
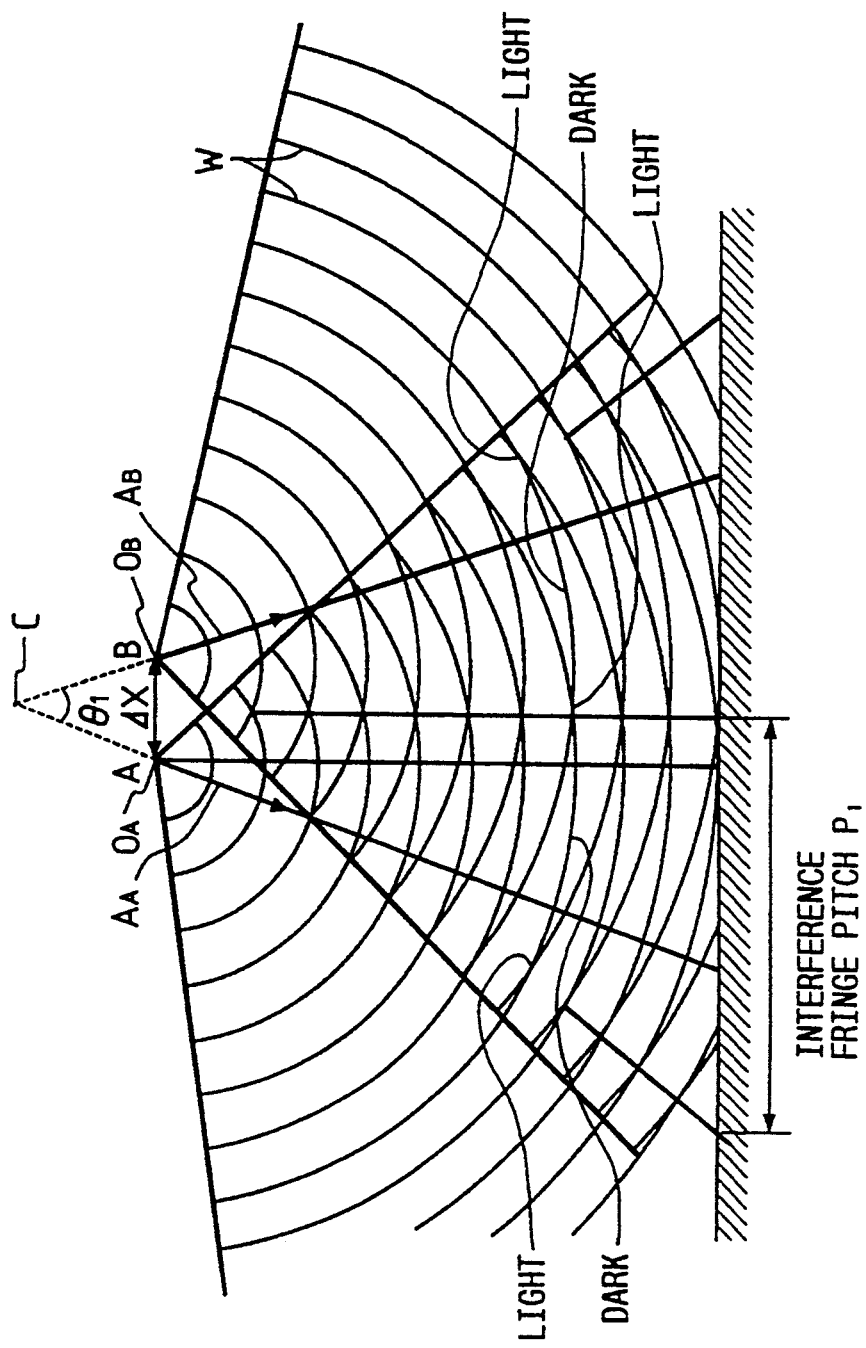
FIG. 10 is an explanatory view illustrating an interference state of a spherical wave.

FIG. 10 illustrates a state wherein the main rays of two light beams A and B having spherical waves have an angular difference therebetween. Points $O_A$ and $O_B$ respectively represent convergence points of the two light beams A and B, $A_A$ and $A_B$ represent the main rays of the two light beams A and B, and W represents the wave surface. In this ray state, the main rays seem to cross at a specific position (a point C in FIG. 10). The position where the main rays seem to cross will be referred to as a crossing position hereinafter. If the convergence positions of the light beams do not coincide with the crossing position, two point light sources (convergence points) are undesirably separated from each other. Since the point light source coincides with the center of the spherical wave of each light beam, the spherical waves of the two light beams define a non-concentric state, and interference fringes are generated on the sensor surface, as indicated by "light" and "dark" in FIG. 10. A pitch P1 of the interference fringes on the sensor surface depends on the ratio (ΔX/R) of a separation amount ΔX of the convergence points $O_A$ and $0_B$ to a distance R from the point light source to the observation surface (the spherical wave on the observation surface has a curvature 1/R) independently of an angle $θ_1$ formed between the main rays of the light beams A and B. As the ratio ΔX/R approaches 0, the pitch P1 of the interference fringes is increased, and as a result, a change in interference state is decreased. In an extreme case, if ΔX=0, the pitch P1 of the interference fringes becomes an infinity and the interference state is left unchanged, regardless of the value of $θ_1$. When the convergence points $0_A$ and $O_B$ are caused to approach the crossing position C of the main rays of the two interfered light beams, the separation amount ΔX can be minimized. The crossing position of the main rays of the two interfered light beams will be described below. In the case of the optical system shown in FIG. 8, the relationship among the crossing position of the main rays of the two interfered light beams, the ratio of the wavelength to the grating (lattice) pitch, and the rotational angle (azimuth angle) θ (FIG. 8) can be expressed by a graph shown in FIG. 13 if an inter-grating distance L2 is defined as a unit length (the crossing position of the main rays of the two interfered light beams is expressed by the distances from the gratings 32B and 32C for synthesizing the light beams: when the sign is negative, it represents a direction to separate away from the gratings 32B and 32C when viewed from sensor surfaces 4b and 4c; when the sign is positive, it represents a direction to approach the gratings 32B and 32C). As can be seen from FIG. 13, the crossing position of the two interfered light beams is almost constant independently of the wavelength λ, the grating pitch P, and the azimuth angle θ in this optical system, and is a middle optical path length position of an optical path between the gratings 32A and 32B (an optical path of light split by the grating 32A until it is incident on the grating 32B after it is reflection-diffracted by the scale 21) or an optical path between the gratings 32A and 32C (an optical path of light split by the grating 32A until it is incident on the grating 32C after it is reflection-diffracted by the scale 20), i.e., a position corresponding to an optical path length half the optical path length of the optical path from the grating 32A to the grating 32B or 32C. As is also seen from FIG. 13, in the apparatus shown in FIG. 7 wherein each convergence point is set at an optical path length position half the optical path length of the optical path from the grating 32A to the grating 32B or 32C (i.e., a position separated by an optical path length of about (L+L')/2 from the diffraction grating 32B or 32C where L and L' are the optical path lengths of the two interfered diffracted light beams from the diffraction grating 21 to the diffraction grating 32B or 32C), the crossing position of the two interfered light beams substantially coincides with the convergence position, the spherical waves of the two light beams define a concentric state, and no interference fringes are theoretically generated on the sensor surface.

Figure 14:
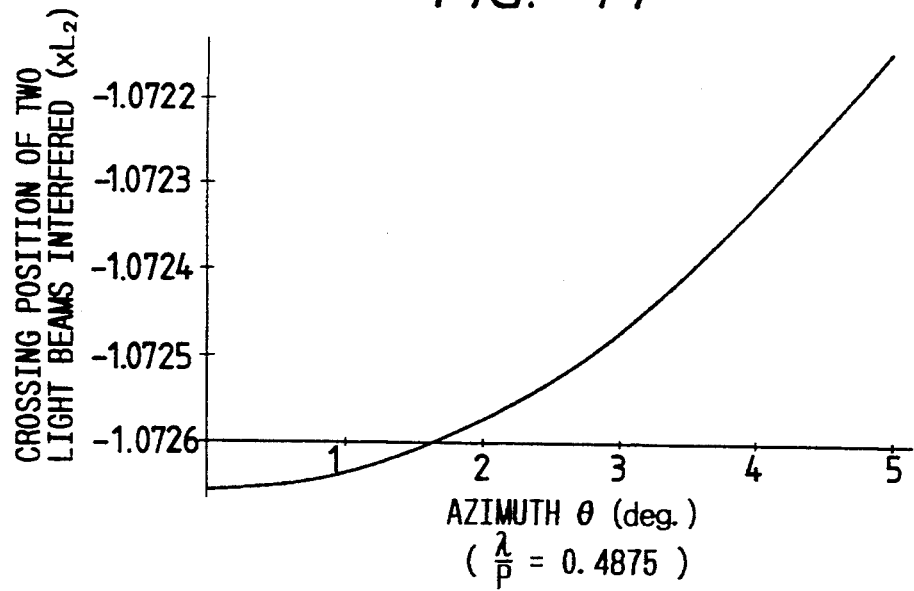
FIG. 14 is a graph showing the relationship between the crossing position of two interfered light beams, and the mounting error angle (azimuth angle) of a scale relative to a head.

FIG. 14 is a graph showing the relationship between the azimuth angle θ and the crossing position. As can be understood from FIG. 14, the crossing position finely moves in a direction to approach the scale 20 in practice as the azimuth angle θ is increased. The reason for this is as follows. When an azimuth angle θ is given to the scale, the direction of reflection diffraction begins to be displaced in the Y-and X-axis directions in FIG. 8. However, the displacement in the Y-axis direction can be ignored when the azimuth angle θ is small or when the diffraction angle is small. More specifically, in this case, the crossing position of the two interfered light beams can be calculated according to the displacement in the X-axis direction alone, and almost coincides with the above-mentioned middle position of the optical path between the gratings. However, when the azimuth angle θ or the diffraction angle is increased from the above-mentioned case, the displacement in the Y-axis direction cannot be ignored, and the crossing position of the two interfered light beams moves in the direction to approach the scale. However, the moving amount of the crossing position is negligible as compared to the inter-grating distance, as can be understood from FIG. 14.

As is apparent from the above description, when the light beams are converged by the collimator lens 31A on positions corresponding to substantially middle positions of the optical path length between the gratings, a decrease in output caused by the relative angle (azimuth angle) between the scale and the diffraction gratings 32A, 32B, and 32C for splitting and synthesizing the light beams can be suppressed. For example, in this embodiment, if the inter-grating distance is set to be 1 mm, P=1.6 μm, and λ=0.78 μm, the theoretical convergence position is a position separated by −1.072657 mm from the diffraction grating 32B or 32C for synthesizing the light beams.

A displacement between the theoretical convergence position and the real convergence position will be examined in detail hereinafter. First, the relationship between the incident and exit angles with respect to the diffraction grating and the direction in which the grating is present will be clarified below. Thus, if the incident vector to the diffraction grating is represented by $U_0$ ($u_{0x}$, $u_{0y}$, $u_{0z}$), the exit vector is represented by $U_1$ ($u_{1x}$, $u_{1y}$, $u_{1z}$), the grating is present on the x-y plane of the Cartesian coordinate system, the grating pitch is represented by P (Px is the pitch in the x-direction; Py is the pitch in the y-direction), the order of diffraction is represented by m, and the wavelength of light is represented by $\lambda$, the following relations are established:

$$u_{1x} = u_{0x} + m\lambda/P_x$$

$$u_{1y} = u_{0y} + m\lambda/P_y$$

$$u_{1x}^2 + u_{1y}^2 + u_{1z}^2 = 1$$

$$u_{0x}^2 + u_{0y}^2 + u_{0z}^2 = 1 \quad (5)$$

Based on these relations, when rotation of the relative angle (azimuth angle) $\theta$ occurs between the scale 20 and the gratings 32A to 32C for splitting and synthesizing the light beams, as shown in FIG. 9, the exit vectors from the grating 32B for synthesizing the light beams $R_0{+1}_{-1}$ and $R_{+1}{-1}_0$ extracted as interference light are as follows (a direction toward the grating 32A is defined as a positive direction).

The exit vector $U_2$ ($u_{2x}$, $u_{2y}$, $u_{2z}$) of the light beam $R_0{+1}_{-1}$ from the grating 32B is expressed by:

$$\begin{aligned} u_{2x} &= \lambda(\cos\theta - 1)/P \\ u_{2y} &= \lambda\sin\theta/P \end{aligned} \quad (6)$$

$$u_{2z} = \sqrt{(1 - 2\lambda^2(1 - \cos\theta)/P^2)}$$

The exit vector $U_2'$ ($u_{2x}'$, $u_{2y}'$, $u_{2z}'$) of the light beam $R_{+1}{-1}_0$ from the grating 32B is expressed by:

$$\begin{aligned} u_{2x}' &= \lambda(\cos\theta - 1)/P \\ u_{2y}' &= -\lambda\sin\theta/P \end{aligned} \quad (7)$$

$$u_{2z}' = \sqrt{(1 - 2\lambda^2(1 - \cos\theta)/P^2)}$$

From equations (7) and (8), an angular difference $\theta_1$ between the two interfered light beams is expressed as follows in consideration of $\theta_1 = \text{ArcCos}[U_2 \cdot U_2']$ ($\cdot$ is the inner product of the vectors):

$$\theta_1 = \text{ArcCos}[(2\lambda/P)^2(\cos\theta - 1) + 1]$$

Since the azimuth angle is about several degrees, the above-mentioned equation is rewritten as follows by approximating up to a 2nd-order term of $\theta$:

$$\theta_1 = (2\lambda/P)\theta \ (\text{for } 0 < 1) \quad (8)$$

Figure 11:
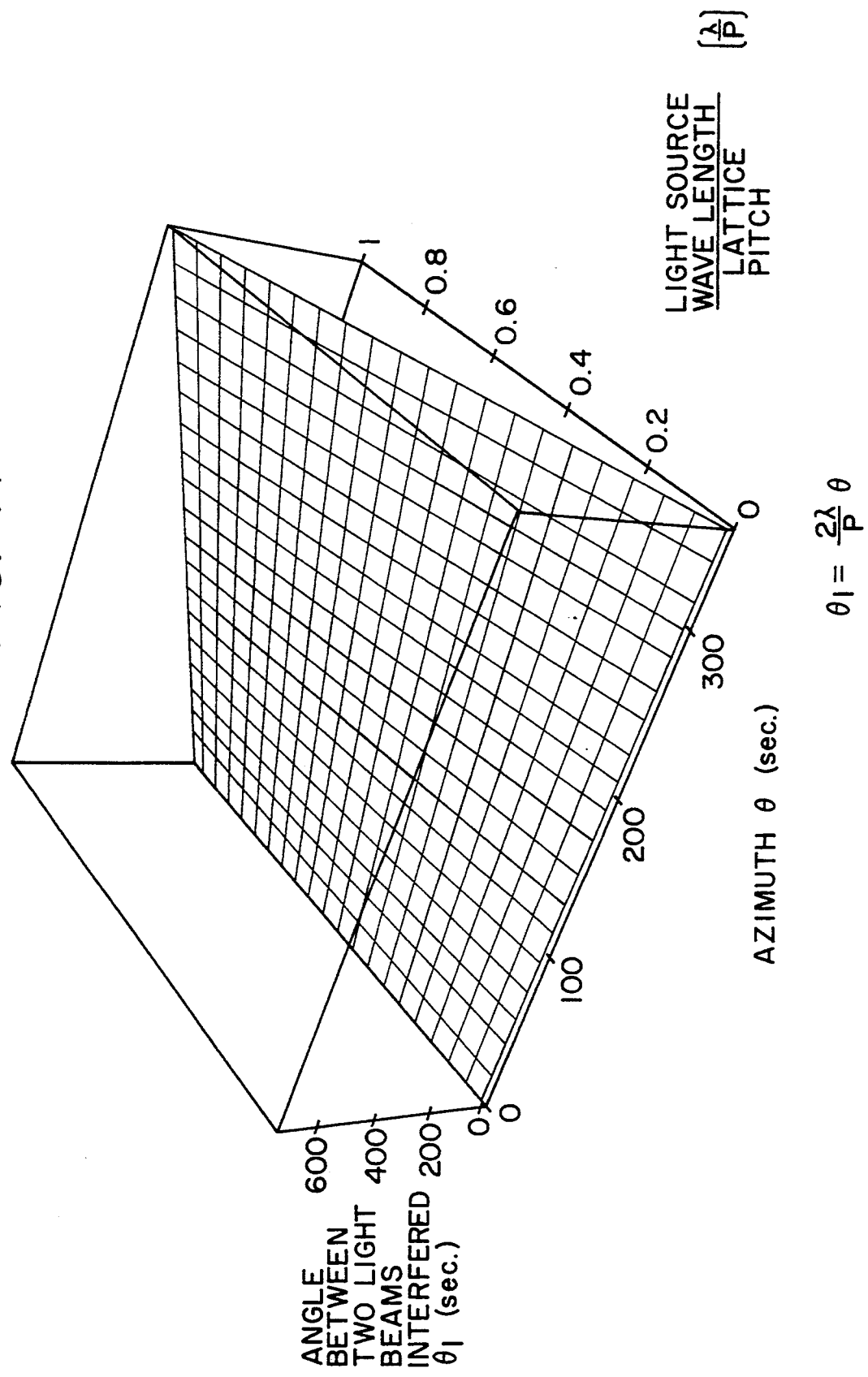
FIG. 11 is a graph showing the relationship among the angular difference between two interfered light beams, the mounting error angle (azimuth angle) of a scale relative to a head, and the ratio of the wavelength of a light source to the grating pitch.
Figure 12:
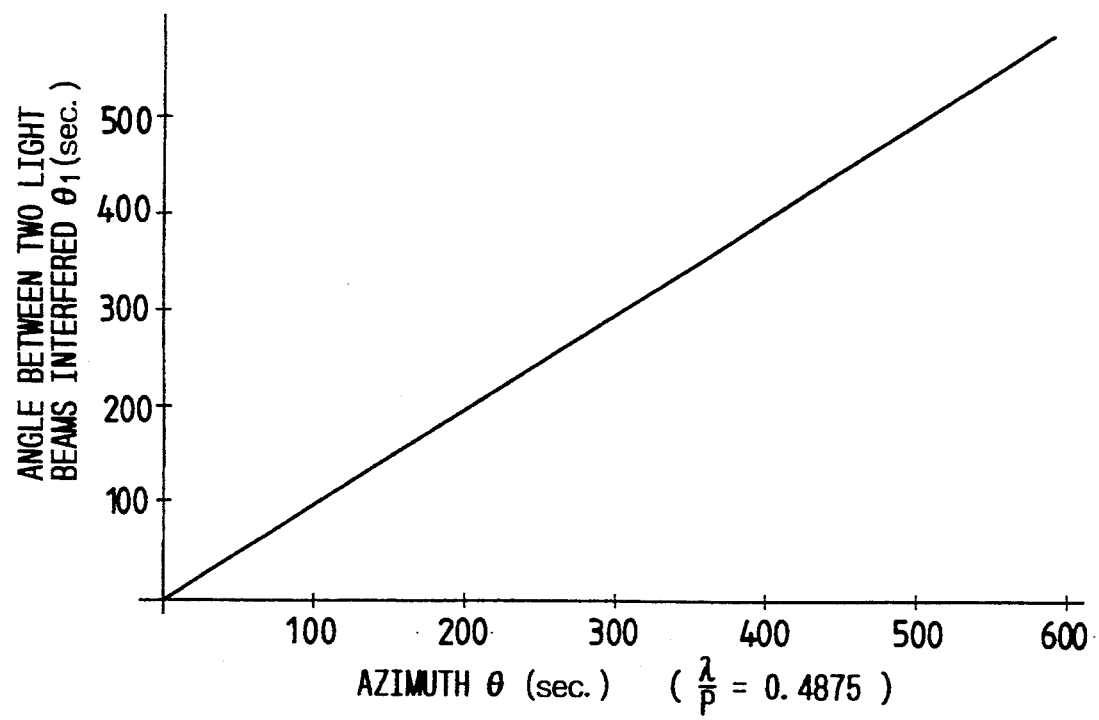
FIG. 12 is a graph showing the relationship between the angular difference between two interfered light beams, and the mounting error angle (azimuth angle) of a scale relative to a head.

From this equation, the relationship among the angular difference $\theta_1$ between the two interfered light beams, $\lambda/P$, and the azimuth angle $\theta$ is as shown in FIG. 11, and is as shown in FIG. 12 if $\lambda = 0.78$ μm and $P = 1.6$ μm.

Figure 13:
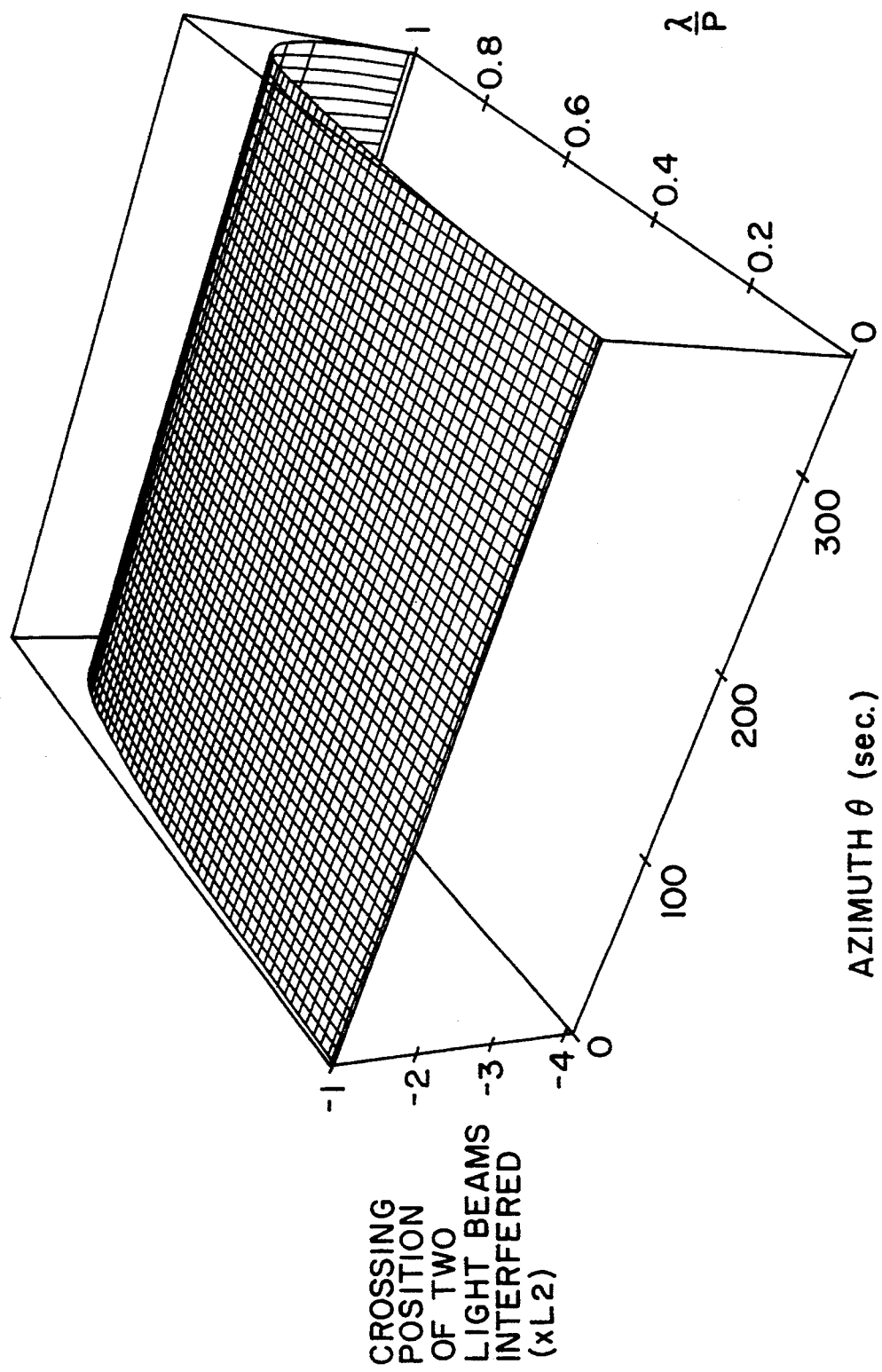
FIG. 13 is a graph showing the relationship among the crossing position of two interfered light beams, the mounting error angle (azimuth angle) of a scale relative to a head, and the ratio of the wavelength of a light source to the grating pitch.

Then, paying attention to the light beams incident on the grating 32B, the crossing position of the main rays of the two interfered light beams $R_0{+1}_{-1}$ and $R_{+1}{-1}_0$ when viewed from the sensor surface is calculated. The vectors of the light beams emerging from the synthesizing grating 32B of these two light beams are respectively given by equations (6) and (7). When equations (5) and the interval between the diffraction gratings are used, crossing points between the two light beams and each diffraction grating can be obtained. Thus, the crossing points between the two beams and the grating 32B, i.e., exit positions $P_0$ and $P_{+1}$ of rays on the grating 32B, can be calculated. From these exit positions, a line passing the point $P_0$ and parallel to the vector ($U_2$) given by equations (6), and a line passing the point $P_{+1}$ and parallel to the vector ($U_2'$) given by equations (7) can be calculated. When the crossing position of these two lines is calculated, the calculated position is the crossing position to be obtained. In the following description, the crossing position will be considered to have the grating 32B for synthesizing the two light beams as the origin of the Z-axis and the direction of the scale 20 as a negative direction. The position in the X- and Y-directions can be considered as follows. Angles formed between a perpendicular to the grating 32B and the two light beams $R_0{+1}_{-1}$ and $R_{30}{1}_{-1}{_0}$ separated by an azimuth are almost equal to each other in opposite directions. Thus, the crossing position, in the X- and Y-directions, of the two lines is near the optical axis when there is no azimuth. More specifically, as the crossing position of the two lines, the optical axis direction when there is no azimuth, i.e., the position in the Z-direction need only be considered. In the following description, only the position in the Z-direction will be considered. If the interval $L_2$ between the gratings 32A, 32B, and 32C for splitting and synthesizing the light beams and the grating 21 on the scale is defined as a unit length, relations among the crossing position Z, the azimuth angle $\theta$, and wavelength $\lambda$/pitch P can be obtained using the above-mentioned relations. FIG. 13 illustrates the relations as a graph (the diffraction grating for synthesizing the light beams is defined as the origin of the coordinates: a direction to approach the sensor from the origin is defined as a positive direction; a direction to separate from the sensor is defined as a negative direction). If $\lambda = 0.78$ μm and $P = 1.6$ μm, a graph shown in FIG. 14 is obtained. When the relations expressed as the graph of FIG. 13 are developed for $\theta$, we have:

$$\begin{aligned} Z = &-L_2(1 + 1/\sqrt{1 - (\lambda/P)^2})/2 + \\ &(-(\lambda/P)^2 - ((\lambda/P)^2 + \ldots))L_2\theta^2/8 + \\ &(\text{high-order term of } \theta) \end{aligned} \quad (9)$$

If terms of the second or higher order of $\theta$ are ignored, we have:

$$Z = -L_2(1 + 1/\sqrt{1 - (\lambda/P)^2})/2 \quad (10)$$

When an average optical path length of different optical path lengths from the scale 21 to the grating 32B is calculated, it substantially coincides with the distance Z given by equation (10). Equation (10) yields $-1.07265$ if $\lambda = 0.78$ μm and $P = 1.6$ μm are substituted. As can be understood from the above description, the position of $-1.072$ in FIG. 14 almost corresponds to an average distance of two different optical path lengths from the scale 21 to the diffraction grating for synthesizing the light beams. Therefore, in a region satisfying $\theta \leq 5°$, approximation of equation (10) is established. In this case, since the position of the scale is $-1$, it can also be understood that the position of $-1.072$ is near the scale. Furthermore, as can be understood from FIG. 13 or equation (10), even when the azimuth angle is changed, if the ratio $\lambda/P$ is smaller than 1 and is not close to 1, the crossing position of the two interfered light beams is almost constant.

As can be seen from the above description, as long as the light beams converge on the crossing positions of the two interfered light beams, a change in interference state caused by the azimuth angle can be almost removed. However, when the light beams converge on a position displaced from the theoretical light beam convergence position, the interference state changes, and this leads to a decrease in output. The number of interference fringes on the sensor caused by the displacement of the light beam convergence position will be calculated below.

Figure 17:
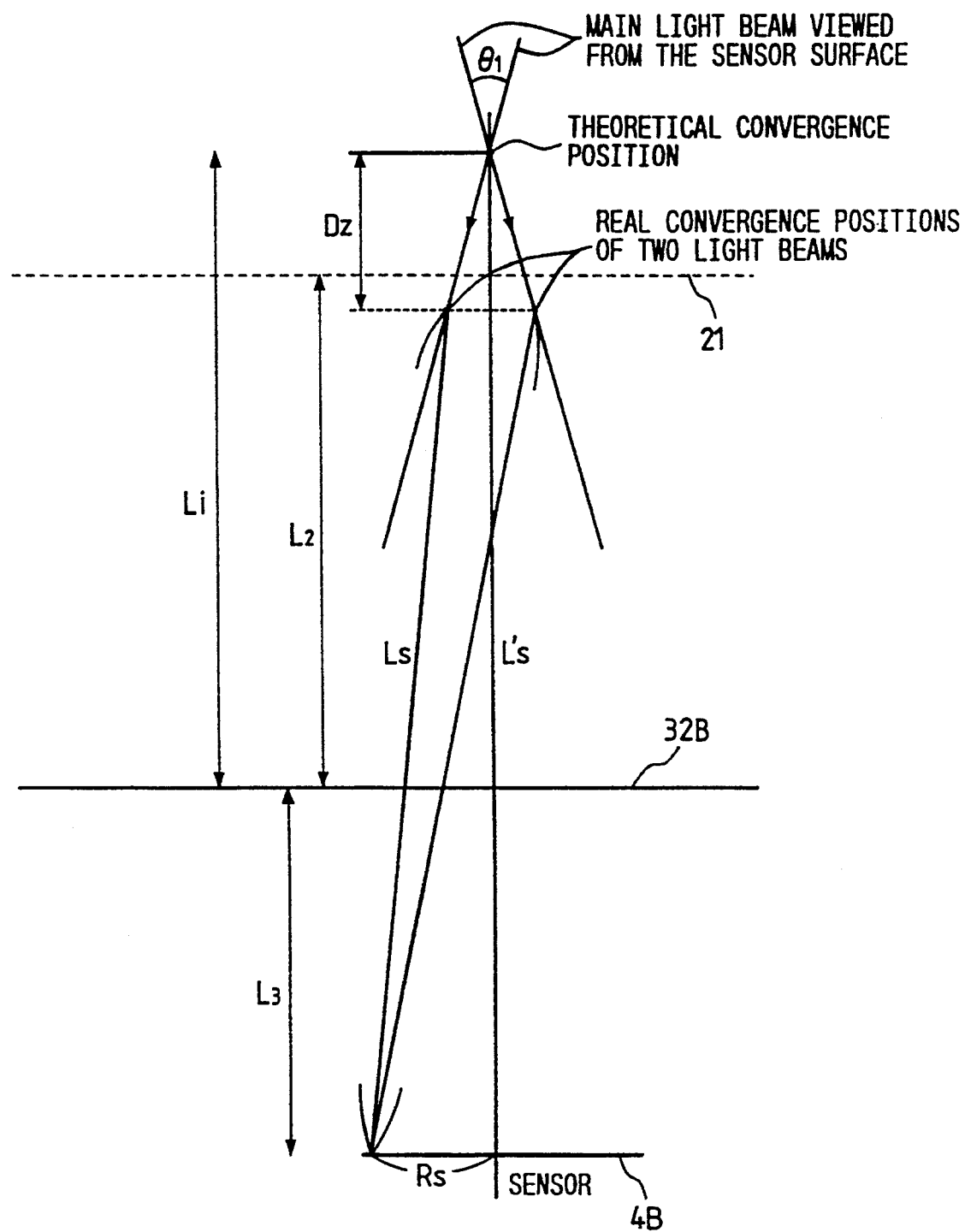
FIG. 17 is a view showing the positional relationship between the convergence position and a sensor.

As shown in FIG. 17, if the distance from a crossing point (this point is set as the center of the sensor surface) between a normal drawn from the theoretical light beam convergence position to the sensor surface and the sensor surface to the sensor end is represented by $R_s$, the distances between the sensor end and the convergence points are represented by $L_s$ $L_s'$ ($L_s < L_s'$), the interval between the diffraction grating 32B for synthesizing the two light beams and the sensor 4B is represented by $L_3$, the theoretical convergence position is represented by $L_i$, and a displacement from the theoretical convergence position is represented by $D_z$, the distances $L_s$ and $L_s'$ are respectively given by:

$$L_s = \sqrt{((L_i - D_z + L_3)^2 + (R_s - D_z\tan(\theta_1/2))^2)}$$

$$L_s' = \sqrt{((L_i - D_z + L_3)^2 + (R_s + D_z\tan(\theta_1/2))^2)}$$

An optical path difference $\Delta L$ between these two optical paths is given by:

$$\Delta L = |L_s' - L_s|$$

Therefore, when $\Delta L = \lambda/2$, the center of the sensor becomes lightest, and the sensor end becomes darkest. As a result, the number of interference fringes on the entire sensor surface is one. Thus, the number $H_{0n}$ of interference fringes on the sensor surface is given by:

$$\begin{aligned} H_{0n} &= 2|\Delta L|/\lambda \\ &= 2| \sqrt{((L_i - D_z + L_3)^2 + (R_s + D_z\tan(\theta_1/2))^2)} \\ &\quad - \sqrt{((L_i - D_z + L_3)^2 + (R_s - D_z\tan(\theta_1/2))^2)} |/\lambda \end{aligned}$$

In this case, $\theta_1$ is a function of the azimuth angle $\theta$ from equation (8), and as given by equation (10) when the optical system shown in FIG. 7 is adopted, $L_i$ is given by:

$$2L_i = -L_2(1 + 1/\sqrt{1 - (\lambda/P)^2}) \quad (11)$$

Since $H_{0n}$ satisfies $H_{0n} = R_s n$ (where n is the number of interference fringes per unit length), we have:

(12)

$$\begin{aligned} R_s n = &\; 2|((-L_2(1 + 1/\sqrt{1 - (\lambda/P)^2})/2 - D_z + L_3)^2 + \\ &\; (R_s + D_z\tan(\theta_1/2))^2)^{\frac{1}{2}} - \\ &\; ((-L_2(1 + 1/\sqrt{1 - (\lambda/P)^2})/2 - D_z + L_3)^2 + \\ &\; (R_s - D_z\tan(\theta_1/2))^2)^{\frac{1}{2}}|/\lambda \end{aligned}$$

The relationship between the sensor output and the number of interference fringes on the sensor surface will be explained below. When the interference fringes are generated on the sensor surface, the amplitude of the light-receiving element output is decreased. When the number of interference fringes on the sensor surface approaches zero, the amplitude of the light-receiving element output is maximized. Thus, if the contrast of the interference fringes is represented by V, V is given by:

$$V = (I_{max} - I_{min})/(I_{max} + I_{min})$$

where $I_{max}$ and $I_{min}$ are the maximum and minimum amplitudes of the light-receiving element output. If the number of interference fringes in a sensor region is represented by $n_s$, and the maximum and minimum outputs of the light-receiving element are represented by $V_{max}$ and $V_{min}$, the outputs $V_{max}$ and $V_{min}$ are respectively given by:

$$\begin{aligned} V_{max} &= \int_{-n_s\pi}^{n_s\pi} (V\cos x + 1)dx/4\pi n_s \\ &= V\sin(\pi n_s)/2\pi n_s + 0.5 \end{aligned}$$

$$\begin{aligned} V_{min} &= \int_{-n_s\pi}^{n_s\pi} (-V\cos x + 1)dx/4\pi n_s \\ &= -V\sin(\pi n_s)/2\pi n_s + 0.5 \end{aligned}$$

Therefore, if the maximum output is defined as 1, a light-receiving sensor output X and interference fringes satisfy:

$$X = \sin(\pi n_s)/\pi n_s$$

Since $n_s = nR_s$, we have:

$$X = \sin(\pi n R_s)/\pi n R_s \quad (13)$$

Figure 15:
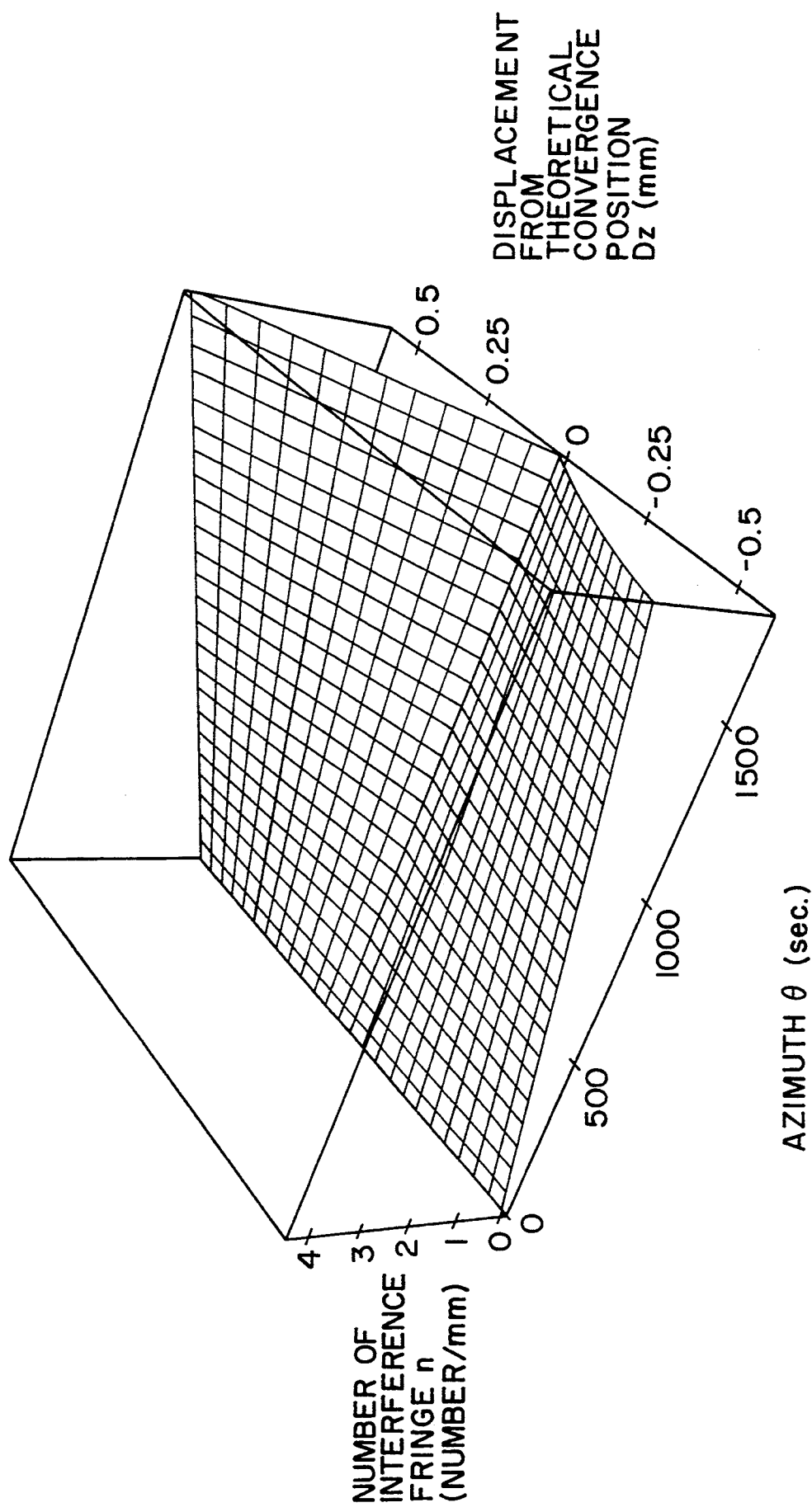
FIG. 15 is a graph showing the relationship between the number of interference fringes per mm, the mounting error angle (azimuth angle) of a scale relative to a head, and the displacement from a theoretical convergence position.
Figure 16:
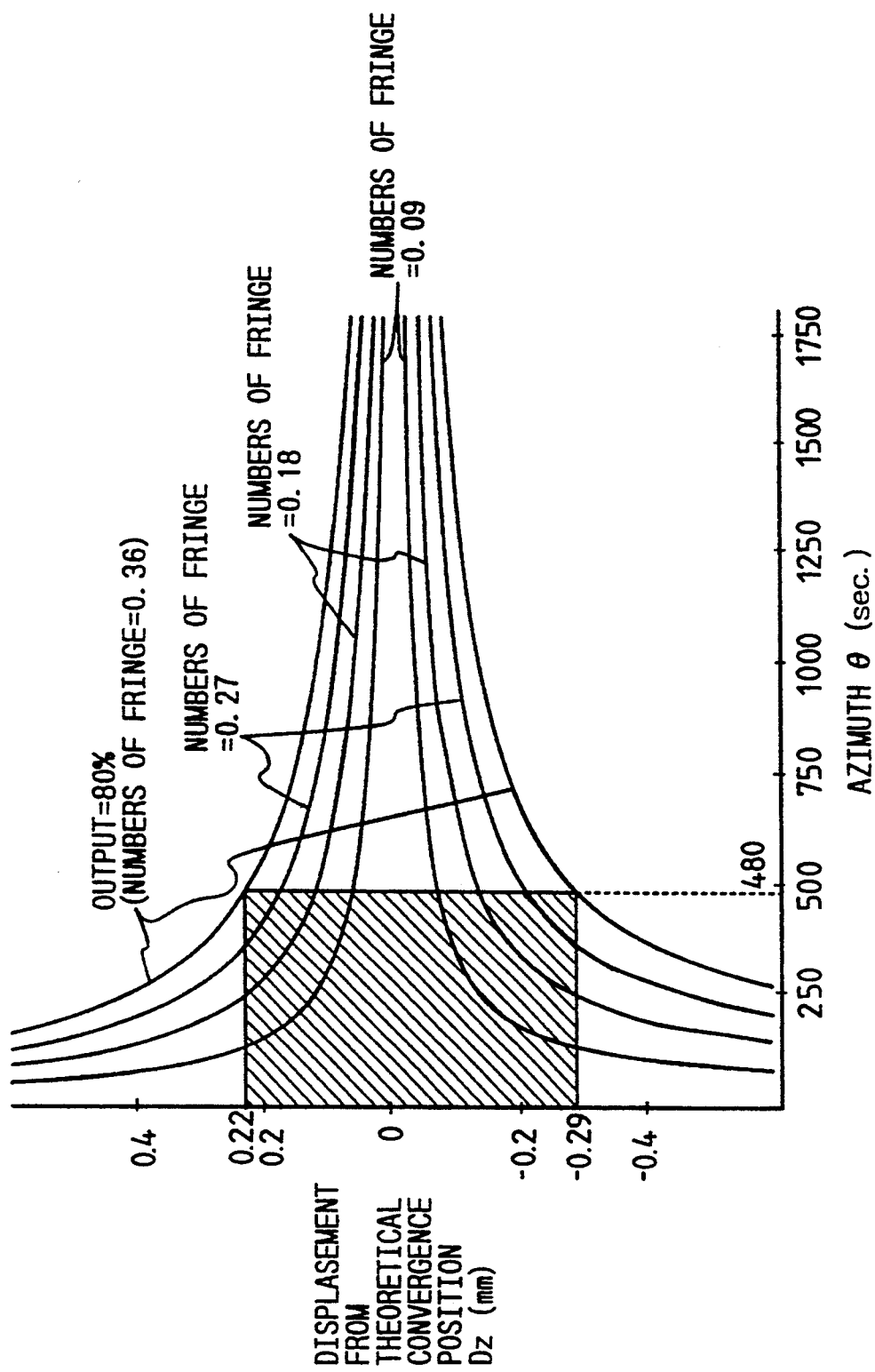
FIG. 16 is a graph showing the relationship between the number of interference fringes per mm, the mounting error angle (azimuth angle) of a scale relative to a head, and the displacement from a theoretical convergence position.

For example, if the inter-grating distance is set to be 1 mm, P=1.6 μm, and λ=0.78 μm, the theoretical convergence position is a position separated by −1.072657 mm from the diffraction gratings 32B and 32C for synthesizing the light beams. At this time, the relationship among the azimuth angle $\theta$, the number n of interference fringes, and the displacement $D_z$ from the theoretical convergence position is as shown in FIGS. 15 and 16 from equation (12). If a decrease in output is within 20%, the maximum number of interference fringes generated on the sensor surface can be defined from equation (13). If the diameter of the sensor is assumed to be 1 mm, the maximum allowable number of fringes is 0.36. If the allowable range of the azimuth angle is defined to be a maximum of 480 seconds (8 minutes), the corresponding region of the displacement $D_z$ from the theoretical convergence position is determined from FIG. 16, and the region satisfying the above-mentioned conditions is indicated by hatching in FIG. 16. As can be understood from FIG. 16, target stability can be obtained by constituting an optical system which focuses light beams within a range satisfying:

$$-0.29 \text{ mm} \leq D_z \leq 0.22 \text{ mm}$$

In this manner, with the arrangement shown in FIG. 7, an encoder in which the output is less influenced by mounting errors of the scale, and easy mounting and assembling processes are allowed, can be realized.

Figure 18:
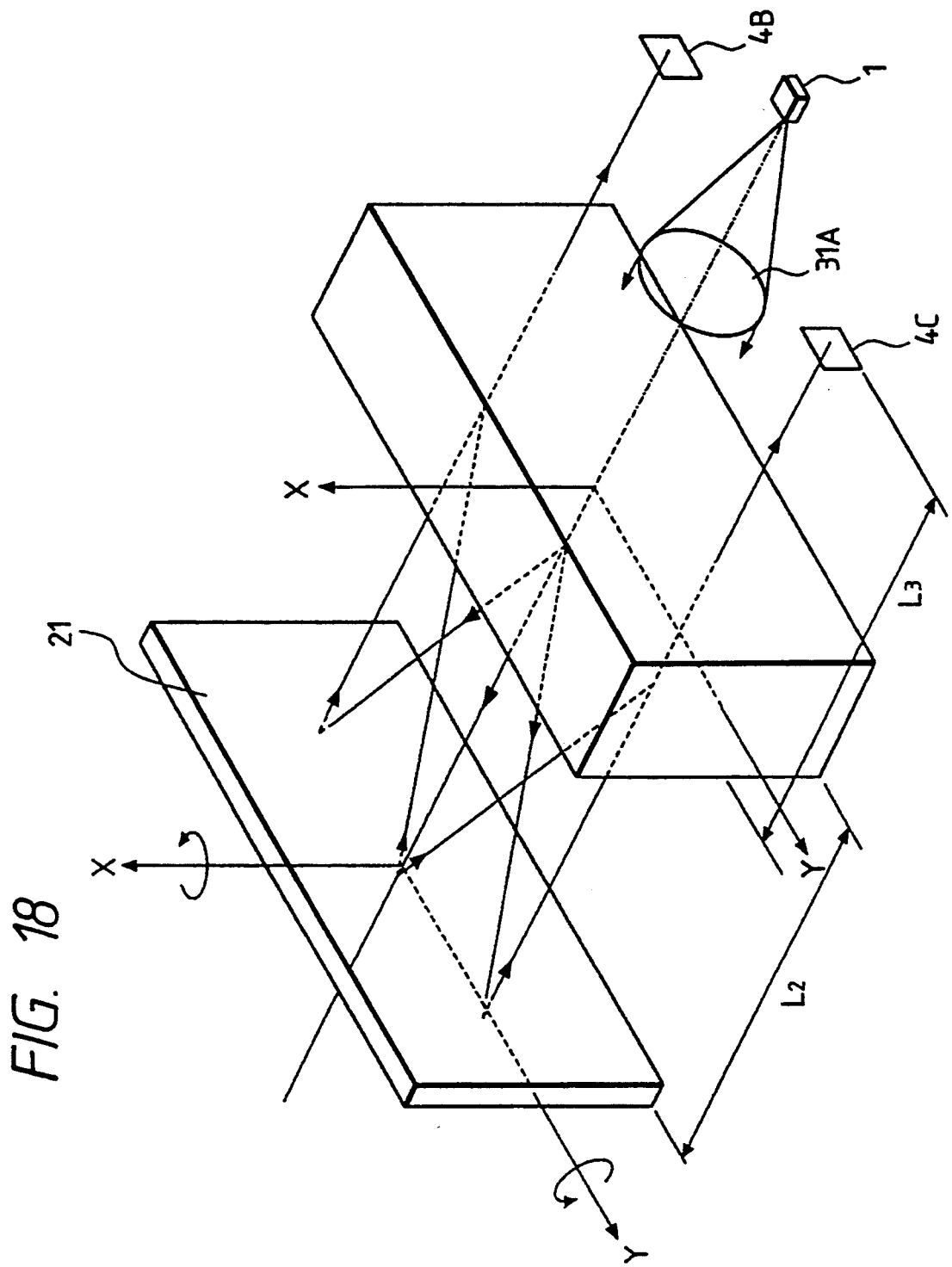
FIG. 18 is a principle view for explaining another mounting error of a scale relative to a head.

Even when the diffraction grating 21 on the scale and the diffraction gratings (32A, 32B, and 32C) for splitting and synthesizing light beams are arranged to have angular displacements having the X- and Y-axes as rotational axes, as shown in FIG. 18, since apparent light-emitting points of two spherical waves become substantially an identical point, no angular displacement occurs between the wave surfaces of the two interfered light beams, and an interference signal can be stably output.

When the gratings 32C and 32B are arranged to be shifted by a ¼ pitch in the grating alignment direction, the phases of signals output from the sensors 4C and 4B are shifted by 90°, and two-phase signals can be obtained as signal outputs.

Fifth Embodiment

Figure 19:
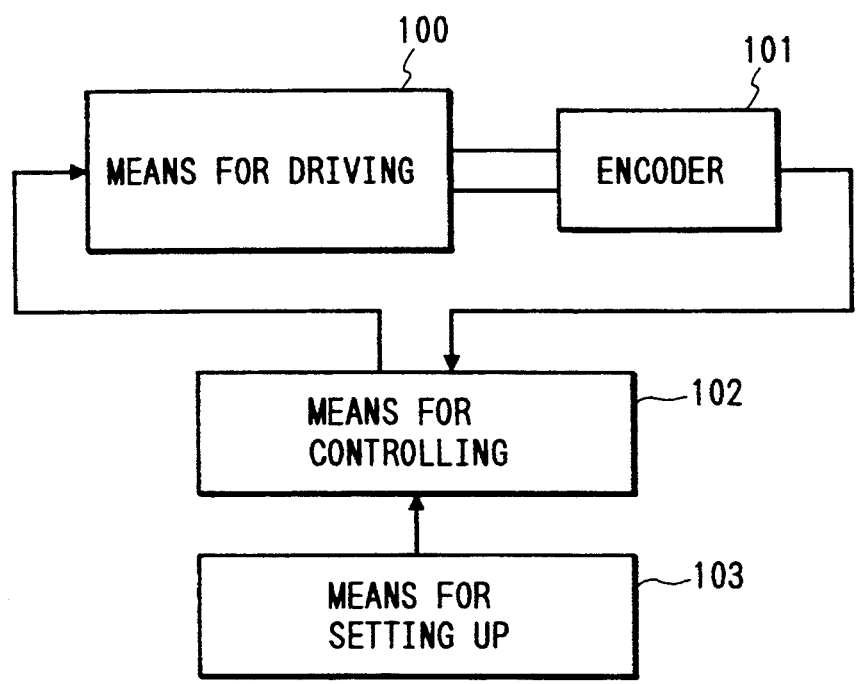
FIG. 19 is a block diagram showing a driving system having an encoder according to the fifth embodiment of the present invention.

FIG. 19 is a block diagram showing an embodiment corresponding to an application of the above-mentioned encoder, i.e., a driving system using the encoder. An encoder 101 is attached to a driving output portion of or a moving portion of an object to be driven by a driving means 100 having a driving source such as a motor, an actuator, an engine, or the like, and detects a displacement state such as a displacement amount, a displacement speed, and the like. As the encoder, one of the encoders in the first to fourth embodiments is used. The detection output of the encoder 101 is fed back to a controlling means 102, and the controlling means 102 supplies a driving signal to the driving means 100 so as to attain a state set by a setting up means 103. When this feedback system is constituted, the driving state set by the setting up means 103 can be obtained. Such a driving system can be widely applied to, e.g., OA equipment such as typewriters, printers, copying machines, facsimile systems, and the like, video equipment such as cameras, video apparatuses, and the like, information recording/reproduction apparatuses, robots, working machines, manufacturing machines, transport machines, and also to any other apparatuses having driving means.

What is claimed is:

1. A displacement information detection apparatus for detecting relative displacement information regarding said apparatus and an object to be detected having a scale grating, said apparatus comprising:

an illumination system for radiating coherent light beams which can interfere with each other;

splitting means for splitting the coherent light beams from said illumination system into first and second light beams, at least one of the first and second light beams being radiated onto the scale grating on the object;

synthesizing means for synthesizing the first and second light beams, at least one of which is diffracted by the scale grating on the object, an interference light beam being generated by the synthesizing operation of said synthesizing means; and a light-receiving element for detecting the interference light beam, the relative displacement information regarding the object and said apparatus being detected upon reception of the interference light beam by said light-receiving element, wherein said illumination system is configured to focus the at least one of the first and second light beams that is diffracted by the scale grating at a location between an optical path of said splitting means and an optical path of said synthesizing means, so that the interference light beam incident on said light-receiving element is a divergent light beam.

2. An apparatus according to claim 1, wherein said synthesizing means comprises a diffraction grating which synthesizes diffracted light beams having mutually different orders emerging from the scale grating on the object.

3. An apparatus according to claim 1, wherein said illumination system comprises a focusing optical element for temporarily focusing the first and second light beams at the location between the optical path of said splitting means and the optical path of said synthesizing means.

4. An apparatus according to claim 1, wherein when optical path lengths of the first and second light beams from the object to said synthesizing means are represented by L1 and L2, respectively the first and second light beams form convergence points at positions having an optical path length of about (L1+L2)/2 from said second means.

5. An apparatus according to claim 1, wherein the first and second light beams form convergence points at substantially middle positions of an optical path length from said splitting means to said synthesizing means.

6. An apparatus according to claim 1, wherein the first and second light beams form convergence points at positions near the object.

7. An apparatus according to claim 1, wherein said splitting means splits the coherent light into a third light beam in addition to the first and second light beams, and said apparatus further comprises another synthesizing means for synthesizing the first and third light beams from the object to form an interference light beam, and another light-receiving element for receiving the interference light emerging from said another synthesizing means, periodic outputs from said two light-receiving elements having different phases.

8. An apparatus according to claim 1, wherein said apparatus further comprises a transparent member, and said splitting means and said synthesizing means respectively comprise diffraction gratings which are formed at neighboring positions on a surface of the transparent member.

9. An apparatus according to claim 1, wherein said apparatus further comprises a transparent member, said splitting means being formed on a surface of said transparent member, and said illumination system comprises a focusing optical system formed on a surface of the transparent member that is different from the surface on which said splitting means is formed.

10. An apparatus according to claim 1, wherein said illumination system comprises a light source for generating a divergent light beam as the coherent light, and a mask for limiting a beam size of the divergent light beam emitted from said light source.

11. An apparatus according to claim 1, wherein said illumination system comprises a light source for generating a divergent light beam as the coherent light, and an optical system for changing a divergent state of the divergent light beam emitted from said light source.

12. An apparatus according to claim 1, further comprising an optical system, arranged at an outgoing side of the light beam of said synthesizing means for converting a wave surface of the interference light beam from said synthesizing means to have a convex spherical shape with respect to the propagation direction of the light beam.

13. A driving system comprising:

an illumination system, arranged on a first object, for radiating coherent light beams which can interfere with each other;

a first diffraction grating, arranged on the first object, for splitting the coherent light beams from said illumination system into first and second light beams, the first and second light beams being radiated onto a scale grating arranged on a second object, which is movable relative to the first object;

a second diffraction grating, arranged on the first object, for synthesizing the first and second light beams diffracted by the scale grating, an interference light beam being generated by the synthesizing operation of said second diffraction grating;

a light receiving element, arranged on the first object, for detecting the interference light beam, relative displacement information regarding the first and second objects being detected upon reception of the interference light beam by said light-receiving element; and a control unit for performing relative movement control between the first and second objects on the basis of the relative displacement information, wherein said illumination system is configured to focus the first and second light beams at a location between respective optical paths of said first and second diffraction gratings, so that the interference light beam incident on said light-receiving element is a divergent light beam.

14. A displacement information detection apparatus for detecting relative displacement information regarding said apparatus and an object to be detected, said apparatus comprising:

a diffraction grating to be detected arranged on the object to be detected;

an illumination system for radiating coherent light beams which can interfere with each other;

a splitting diffraction grating for splitting the coherent light beams from said illumination system into first and second light beams, the first and second light beams being radiated onto said diffraction grating to be detected;

a synthesizing diffraction grating for synthesizing the first and second light beams diffracted by said diffraction grating to be detected, an interference light beam being generated by the synthesizing operation of said synthesizing diffraction grating; and a light-receiving element for detecting the interference light beam, the relative displacement information regarding the object and said apparatus being detected upon reception of the interference light beam by said light-receiving element, wherein said illumination system is configured to focus the first and second light beams at a location between an optical path of said splitting diffraction grating and an optical path of said synthesizing diffraction grating, so that the interference light beam incident on said light-receiving element is a divergent light beam.

15. An apparatus according to claim 14, wherein said synthesizing diffraction grating synthesizes diffracted light beams having mutually different orders emerging from the diffraction grating to be detected.

16. An apparatus according to claim 14, wherein said illumination system comprises a focusing optical element for temporarily focusing the first and second light beams at the location between the respective optical paths of said splitting and said synthesizing diffraction gratings.

17. An apparatus according to claim 14, wherein when optical path lengths of the first and second light beams from said diffraction grating to be detected to said synthesizing diffraction grating are represented by L1 and L2, the first and second light beams form convergence points at positions having an optical path length of about $(L1+L2)/2$ from said synthesizing diffraction grating.

18. An apparatus according to claim 14, wherein the first and second light beams form convergence points at substantially middle positions of an optical path length from said splitting diffraction grating to said synthesizing diffraction grating.

19. An apparatus according to claim 14, wherein the first and second light beams form convergence points at positions near said diffraction grating to be detected.

20. An apparatus according to claim 14, wherein said splitting diffraction grating splits the coherent light beams into a third light beam in addition to the first and second light beams, and said apparatus further comprises another synthesizing diffraction grating for synthesizing the first and third light beams from said diffraction grating to be detected to form an interference light beam, and another light-receiving element for receiving the interference light emerging from said another synthesizing diffraction grating, periodic outputs from said two light-receiving elements having different phases.

21. An apparatus according to claim 14, wherein said apparatus further comprises a transparent member, and said splitting and synthesizing diffraction gratings are formed at neighboring positions on a surface of the transparent member.

22. An apparatus according to claim 14, wherein said apparatus further comprises a transparent member, said splitting diffraction grating being formed on a surface of said transparent member, and said illumination system comprises a focusing optical element formed on a surface of the transparent member that is different from the surface on which said splitting diffraction grating is formed.

23. An apparatus according to claim 14, wherein said illumination system comprises a light source for generating a divergent light beam as the coherent light, and a mask for defining a beam size of the divergent light beam emitted from said light source.

24. An apparatus according to claim 14, wherein said illumination system comprises a light source for generating a divergent light beam as the coherent light, and an optical system for changing a divergent state of the divergent light beam emitted from said light source.

25. An apparatus according to claim 14, further comprising an optical system, arranged at an outgoing side of the light beam of said synthesizing diffraction grating, for converting a wave surface of the interference light beam from said synthesizing diffraction grating to have a convex spherical shape with respect to the propagation direction of the light beam.

* * * * *

UNITED STATES PATENT AND TRADEMARK OFFICE
CERTIFICATE OF CORRECTION

PATENT NO. : 5,390,022
DATED : February 14, 1995
INVENTOR(S) : KOH ISHIZUKA, ET AL.

It is certified that error appears in the above-indentified patent and that said Letters Patent is hereby corrected as shown below:

ON THE TITLE PAGE:

at [56] References Cited

Under "FOREIGN PATENT DOCUMENTS":

"01180615 12/1989 Japan
02262064 10/1990 Japan" should read

--01-180615 12/1989 Japan
02-262064 10/1990 Japan--.

IN THE DRAWINGS:

Sheet 6 of 18

FIG. 6A and FIG. 6B, "SURFASE" (all occurrences) should read --SURFACE--.

Sheet 15 of 18

FIG. 16, "DISPLASEMENT" should read --DISPLACEMENT--.

UNITED STATES PATENT AND TRADEMARK OFFICE
CERTIFICATE OF CORRECTION

PATENT NO. : 5,390,022
DATED : February 14, 1995
INVENTOR(S) : KOH ISHIZUKA, ET AL.

It is certified that error appears in the above-indentified patent and that said Letters Patent is hereby corrected as shown below:

COLUMN 3:

Line 45, "+1-order" should read --+1st order--.

Line 66, "+st-order" should read --+1st order--.

COLUMN 4:

Line 1, "$R_{+1}^{-1}$," should read --$R_{+1}$,--.

Line 6, "light" (second occurrence) should read --light beam.--

Line 19, "light" (first occurrence) should read --light beam--.

Line 46, "$\{-2\pi x/P-\pi/2\}=-4\pi x/P-\pi/2$ (2)" should read --$\{-2\pi x/P-\pi/2\}-\{+2\pi x/P\}=-4\pi x/P-\pi/2$ (2)--.

COLUMN 6:

Line 5, "-con-" should read --con- --.

Line 46, "encodes" should read --encoder--.

UNITED STATES PATENT AND TRADEMARK OFFICE
CERTIFICATE OF CORRECTION

PATENT NO. : 5,390,022
DATED : February 14, 1995
INVENTOR(S) : KOH ISHIZUKA, ET AL.

It is certified that error appears in the above-indentified patent and that said Letters Patent is hereby corrected as shown below:

COLUMN 7:

Line 22, "$+2\pi x/P$" should read --$+2\pi x/P,$--.

Line 57, "beam $R+1^{-1},$" should read --beam $R_{+1}^{-1},$--.

Line 63, "light" should read --light beam--.

COLUMN 8:

Line 33, "$\kappa$ pitch." should read --1/2 pitch.--.

UNITED STATES PATENT AND TRADEMARK OFFICE
CERTIFICATE OF CORRECTION

PATENT NO. : 5,390,022
DATED : February 14, 1995
INVENTOR(S) : KOH ISHIZUKA, ET AL.

It is certified that error appears in the above-indentified patent and that said Letters Patent is hereby corrected as shown below:

<u>COLUMN 12:</u>

Line 10, "$R_{30\ 1}{}^{-1}{}_0$" should read --$R_{+1}{}^{-1}{}_0$--.

<u>COLUMN 16:</u>

Line 15, "respectively" should read --respectively,--.

Line 18, "second" should read --synthesizing--.

Signed and Sealed this

Thirteenth Day of June, 1995

Attest:

BRUCE LEHMAN

Attesting Officer    Commissioner of Patents and Trademarks